United States Patent
Senarath et al.

(10) Patent No.: US 10,721,362 B2
(45) Date of Patent: Jul. 21, 2020

(54) METHOD AND APPARATUS FOR CUSTOMER SERVICE MANAGEMENT FOR A WIRELESS COMMUNICATION NETWORK

(71) Applicants: Nimal Gamini Senarath, Ottawa (CA); Hang Zhang, Nepean (CA); Sophie Vrzic, Kanata (CA)

(72) Inventors: Nimal Gamini Senarath, Ottawa (CA); Hang Zhang, Nepean (CA); Sophie Vrzic, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/225,552

(22) Filed: Dec. 19, 2018

(65) Prior Publication Data
US 2019/0149666 A1     May 16, 2019

Related U.S. Application Data

(63) Continuation of application No. 15/169,091, filed on May 31, 2016, now Pat. No. 10,200,543.
(Continued)

(51) Int. Cl.
*H04M 15/00* (2006.01)
*H04W 4/24* (2018.01)
*H04L 12/715* (2013.01)

(52) U.S. Cl.
CPC ........ *H04M 15/8016* (2013.01); *H04L 45/64* (2013.01); *H04M 15/66* (2013.01);
(Continued)

(58) Field of Classification Search
CPC ..... H04W 48/16; H04W 84/12; H04W 88/08; H04W 76/02; H04W 76/023;
(Continued)

(56) References Cited

U.S. PATENT DOCUMENTS

| 5,483,533 A | 1/1996 | Kuba |
| 7,849,173 B1 | 12/2010 | Uhlik |

(Continued)

FOREIGN PATENT DOCUMENTS

| CA | 2813026 A1 | 4/2012 |
| CN | 101374055 A | 2/2009 |

(Continued)

OTHER PUBLICATIONS

International Search Report for International Application No. PCT/CN2016/084397 dated Aug. 23, 2016.
(Continued)

*Primary Examiner* — Nizar N Sivji

(57) ABSTRACT

A method and system for providing Customer Service Management (CSM) a communication network, such as a 5G wireless communication network. The communication network provides at least one service involving one or more terminals serviced by the communication network. A CSM function is defined which is based upon said at least one service and customized to said at least one service, to provide service-customized CSM. CSM may provide service-based charging/billing, service-based context management, service-customized QoE control, service-customized network topology.

27 Claims, 13 Drawing Sheets

Related U.S. Application Data

(60) Provisional application No. 62/169,084, filed on Jun. 1, 2015, provisional application No. 62/222,582, filed on Sep. 23, 2015.

(52) U.S. Cl.
CPC ... *H04M 15/8027* (2013.01); *H04M 15/8033* (2013.01); *H04M 15/81* (2013.01); *H04W 4/24* (2013.01)

(58) Field of Classification Search
CPC ... H04W 36/08; H04W 84/045; H04W 28/08; H04W 48/20; H04W 72/005; H04W 72/0406; H04W 76/025; H04W 28/20; H04W 72/044; H04W 16/32; H04W 40/30; H04W 48/08; H04W 72/04; H04W 48/02; H04W 74/00; H04L 63/08; H04L 49/25; H04L 5/0085; H04M 15/73
See application file for complete search history.

(56) References Cited

U.S. PATENT DOCUMENTS

| | | |
|---|---|---|
| 8,855,017 B2 | 10/2014 | Lemieux |
| 2002/0152319 A1 | 10/2002 | Amin et al. |
| 2009/0165097 A1 | 6/2009 | Cherian |
| 2010/0144312 A1 | 6/2010 | Runstedler et al. |
| 2010/0161802 A1 | 6/2010 | Tofighbakhsh et al. |
| 2010/0318448 A1 | 12/2010 | Li et al. |
| 2010/0330957 A1 | 12/2010 | Harada et al. |
| 2011/0125900 A1 | 5/2011 | Janssen et al. |
| 2011/0276447 A1* | 11/2011 | Paul .................. G06Q 30/02 705/34 |
| 2011/0306305 A1 | 12/2011 | Huang et al. |
| 2011/0314145 A1 | 12/2011 | Raleigh et al. |
| 2012/0151009 A1 | 6/2012 | Bouazizi |
| 2012/0233302 A1 | 9/2012 | Kallin et al. |
| 2013/0303114 A1 | 11/2013 | Ahmad et al. |
| 2014/0016464 A1 | 1/2014 | Shirazipour et al. |
| 2014/0086052 A1 | 3/2014 | Cai et al. |
| 2014/0219088 A1 | 8/2014 | Oyman et al. |
| 2014/0258511 A1 | 9/2014 | Sima et al. |
| 2014/0269295 A1 | 9/2014 | Anumala |
| 2014/0362700 A1 | 12/2014 | Zhang |
| 2015/0230184 A1 | 8/2015 | Raleigh et al. |
| 2016/0035264 A1 | 2/2016 | Senarath et al. |
| 2016/0035326 A1 | 2/2016 | Senarath et al. |
| 2016/0100446 A1 | 4/2016 | Jeong |
| 2016/0156513 A1* | 6/2016 | Zhang ................. H04W 4/70 709/220 |
| 2016/0226922 A1 | 8/2016 | Russell |
| 2016/0337922 A1 | 11/2016 | Mustajarvi |
| 2017/0142124 A1 | 5/2017 | Mukhin |
| 2017/0324536 A1 | 11/2017 | Zarifi |

FOREIGN PATENT DOCUMENTS

| | | |
|---|---|---|
| CN | 101562570 A | 10/2009 |
| CN | 102318266 A | 1/2012 |
| CN | 102523291 A | 6/2012 |
| CN | 103038652 A | 4/2013 |
| CN | 103250401 A | 8/2013 |
| CN | 103731887 A | 4/2014 |
| CN | 103905523 A | 7/2014 |
| CN | 103959798 A | 7/2014 |
| CN | 104641601 A | 5/2015 |
| EP | 1784027 A1 | 5/2007 |
| EP | 2325708 A3 | 1/2012 |
| EP | 2627034 A1 | 8/2013 |
| EP | 2577332 B1 | 9/2016 |
| GB | 2311439 A | 9/1999 |
| JP | 2011015021 A | 1/2011 |
| JP | 2016521099 A | 7/2016 |
| WO | 2012162646 A1 | 11/2012 |
| WO | 20130159794 A1 | 10/2013 |
| WO | 2014052044 A2 | 4/2014 |
| WO | 2014194188 A1 | 12/2014 |
| WO | 2014197716 A1 | 12/2014 |

OTHER PUBLICATIONS

International Search Report for International Application No. PCT/CN2016/084406 dated Aug. 29, 2016.
International Search Report for International Application No. PCT/CN2016/084410 dated Aug. 23, 2016.
3GPP TR 22.891 titled Study on New Services and Market Technology Enablers, Sep. 2016.
ETSI GS NFV 001 titled "Network Function Virtualization (NFV); Use Cases", Oct. 2013.
ETSI GS NFV 002 titled "Network Function Virtualization (NFV); Architectural Framework", Oct. 2013.
"NGMN 5G White Paper," by the Next Generation Mobile Network Alliance, Feb. 17, 2015.
Extended European Search Report dated Apr. 12, 2018 for corresponding European Application No. 16802557.5 filed Jun. 1, 2016.
Shrivastava et al. "An SDN—Based Framework for Elastic Resource Sharing in Integrated FDD/TDD LTE-A HetNets", Oct. 8, 2014.
Extended European Search Report dated Apr. 17, 2018 for corresponding European Application No. 16802566.6 filed Jun. 1, 2016.
Extended European Search Report dated Apr. 26, 2018 for corresponding European Application No. 16802563.3 filed Jun. 1, 2016.

* cited by examiner

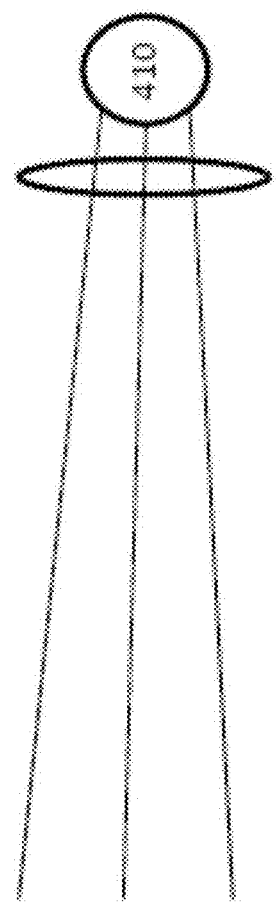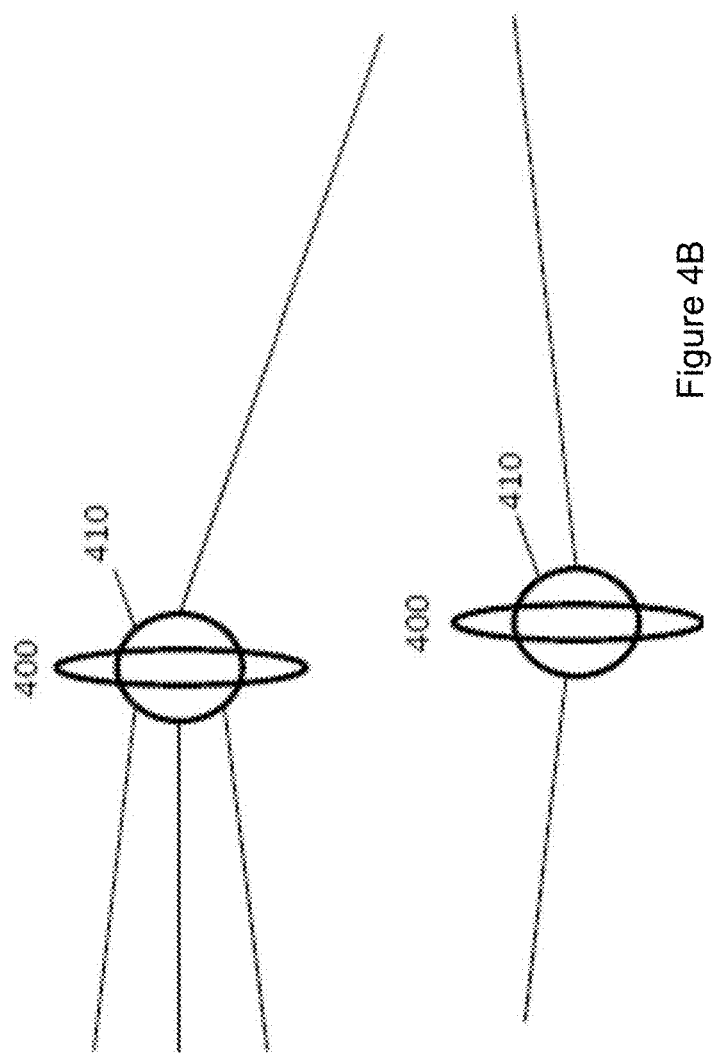
Figure 4A
Figure 4B

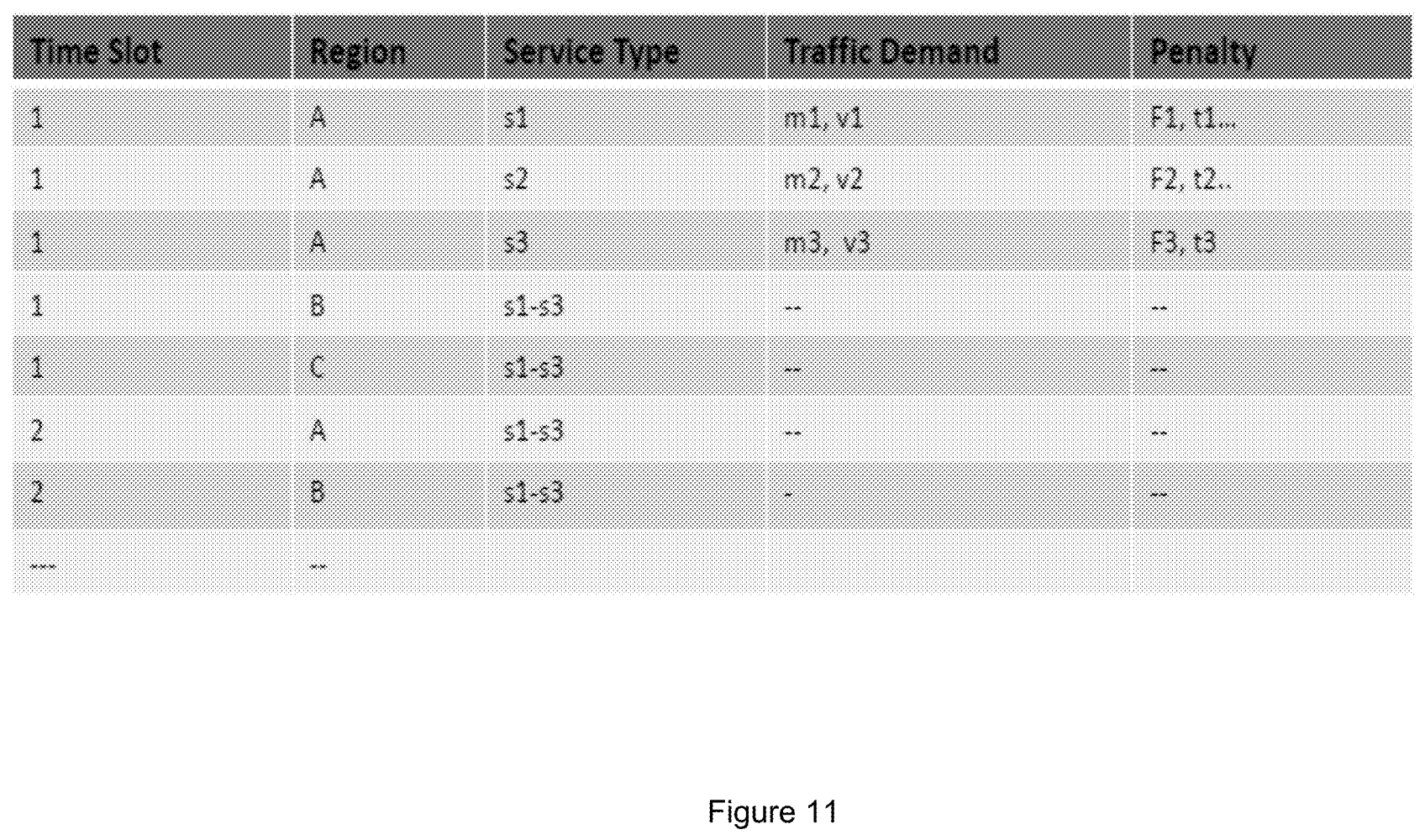

| Time Slot | Region | Service Type | Traffic Demand | Penalty |
|---|---|---|---|---|
| 1 | A | s1 | m1, v1 | F1, t1... |
| 1 | A | s2 | m2, v2 | F2, t2... |
| 1 | A | s3 | m3, v3 | F3, t3 |
| 1 | B | s1-s3 | ... | ... |
| 1 | C | s1-s3 | ... | ... |
| 2 | A | s1-s3 | ... | ... |
| 2 | B | s1-s3 | ... | ... |
| ... | ... | ... | ... | ... |

Figure 11

METHOD AND APPARATUS FOR CUSTOMER SERVICE MANAGEMENT FOR A WIRELESS COMMUNICATION NETWORK

CROSS-REFERENCE TO RELATED APPLICATIONS

This application claims priority from U.S. Provisional Patent Application No. 62/169,084 filed on Jun. 1, 2015, and to U.S. Provisional Patent Application No. 62/222,582 filed on Sep. 23, 2015, and is a continuation of U.S. patent application Ser. No. 15/169,091 filed May 31, 2016, all of which are herein incorporated by reference.

FIELD OF THE INVENTION

The present invention pertains to the field of wireless communication networks and in particular to a method and apparatus for customer service management for a wireless communication network.

BACKGROUND

In current mobile networks, such as those based on Long-Term Evolution (LTE) standards specified by the Third Generation Partnership Project (3GPP), numerous functions, such as fee charging and Quality of Service (QoS) guarantees, are provided by network functions in the core network, also referred to as the Evolved Packet Core (EPC). In so-called 3G networks, these functions were provided by entities in the Packet Core (PC). As it pertains to fee charging, different entities are responsible for collecting the charging information depending on whether the user is on a home or visiting network.

Current network architectures allow for a limited number of charging scenarios, as well as a limited number of QoS levels. Accounting and charging for data traffic is typically on a per-bit basis, and there is limited support for differential charging based on different QoS levels. Conventional approaches to Customer Service Management (CSM) have typically been offered on a per-device basis. However, as technologies and wireless network capabilities have evolved, new services and service levels are possible, but not available due to the limitations of conventional service offerings, CSM, and charging. In order to improve the Quality of Experience (QoE) for users of the networks, a new approach is needed to enable the new technologies and wireless network capabilities to allow for the new services and service levels.

In an aspect, there is a need for a method and apparatus for customer service management for a wireless communication network, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the present invention, there is provided a method for providing CSM in a communication network, the communication network providing at least one service involving one or more terminals serviced by the communication network, the method comprising defining a CSM function based upon said at least one service and customized to said at least one service.

In accordance with embodiments of the present invention, there is provided a system including a CSM function in a communication network, the communication network providing at least one service involving one or more terminals serviced by the communication network, the CSM function based upon said at least one service and customized to said at least one service.

In an implementation, the CSM function provides charging/billing data customized to said at least one service. In an aspect, the charging/billing data relates, and is assigned, to an account corresponding to said at least one service. In an aspect a UE accessing said at least one service is not billed for said access, as the charging/billing data is related to said at least one service and is decoupled from said UE.

In an implementation, a method is provided for Customer Service Management (CSM) in a communication network. The communication network may comprise a virtual network, operated by a controller, that is operative to provide one or more services to one or more UE accessing the virtual network. The UE may each be associated with a corresponding customer. Alternatively, more than one UE may be associated with a same customer. In an aspect, at least one of the services has an associated Quality of Service (QoS)/Quality of Experience (QoE) policy. The policy may be applicable to all UE accessing the service, or may be a device or customer specific policy. A CSM function is operative on the communication network to provide CSM functions. The CSM function may typically comprise code executed across a plurality of processing elements distributed across the network. In some aspects the CSM function may primarily comprise code executed on a single processing element available on the network. In some aspects, the CSM function may primarily be resident at a server location available on the network, and may receive relevant information from other functions of the virtual network.

The method includes the CSM function receiving a report based on the associated Quality of Service (QoS)/Quality of Experience (QoE) policy associated with the service and transmitting QoS instructions to the controller in accordance with the received report and the QoS/QoE policy to effect changes in the virtual network to enforce the QoS/QoE policy.

In an aspect, the CSM function further provides charging/billing for the service by: instructing the controller to configure a CMS charging element in at least one virtual node of the virtual network to collect and forward usage information relating to network usage charging for the service; receiving the usage information from the controller; evaluating the received usage information based upon a charging policy associated with that service to generate a service-based charge; and, forwarding the service-based charge to the customer. As will be appreciated, the term "customer" in this context refers to a computing device operative to act as a custodian for the end user to receive the charging information.

In an aspect of the method, the evaluating the received usage information further comprises evaluating the received usage information based upon the established QoS/QoE policy, and wherein the service-based charge is further based upon the evaluation of the received usage information based upon the established QoS/QoE Policy.

In an aspect, the method may further include a dynamic charging evaluator (DCE) function operative on the network evaluating a dynamic charging state on the network by evaluating a current traffic state on the network based upon a pre-determined charging policy associated with the service and the customer, and communicating the dynamic charging state to the CSM function. The DCE function may typically comprise code executed across a plurality of processing elements distributed across the network. In some aspects the DCE function may primarily comprise code executed on a single processing element available on the network. In some aspects, the DCE function may primarily be resident at a server location available on the network, and may receive relevant information from other functions of the virtual network.

The CSM function may further carry out the steps of receiving the dynamic charging state from the DCE function and instructing at least one of a device traffic controller or a network traffic filter to effect traffic management in relation to the service based upon the dynamic charging state and the pre-determined charging policy associated with the customer and the service.

In an aspect, the CSM function further carries out the steps of establishing a unique global user ID based on the customer, UE, and device context for that UE; sharing the unique global user ID with a plurality of local CSM functions; receiving context from at least one of the plurality of local CSM functions associated with the unique global user ID corresponding to behavior governed by that at least one local CSM function and associated with the unique global user ID; maintaining the received context in association with the unique global user ID; and, sharing the received context between the plurality of local CSM functions.

In an aspect, the CSM function further carries out the steps of establishing a unique global user ID based on the customer, UE, and device context for that UE; sharing the unique global user ID with a plurality of local CSM functions; receiving context from at least one of the plurality of local CSM functions associated with the unique global user ID corresponding to behavior governed by that at least one local CSM function and associated with the unique global user ID; evaluating the received context based upon a charging policy associated with the unique global user ID to generate a bill; and, charging the customer based upon the generated bill. In an aspect, the received context may further be associated with the at least one service, and wherein the charging policy may further be associated with the at least one service; and, wherein the generated bill is charged based upon usage of the at least one service.

In an implementation, a system for Customer Service Management (CSM) is provided. The system may include a communication network that comprises a virtual network operated by a controller, one or more UE receiving a service provided by the virtual network, the service having an associated Quality of Service (QoS)/Quality of Experience (QoE) policy; and, a CSM function operative on the communication network to: receive a QoS/QoE associated with the service; and, transmit QoS instructions to the controller in accordance with the received report and the QoS/QoE policy to effect changes in the virtual network to enforce the QoS/QoE policy.

In an aspect of the system, the CSM function is further operative to: instruct the controller to configure a CMS charging element in at least one virtual node of the virtual network to collect and forward usage information relating to network usage charging for the service; receive the usage information from the controller; evaluate the received usage information based upon a charging policy associated with the service to generate a service-based charge; and, forward the service-based charge to the customer.

In an aspect of the system, the received usage information is evaluated based upon the established QoS/QoE policy, and wherein the service-based charge is further based upon the evaluation of the received usage information based upon the established QoS/QoE Policy.

In an aspect the system further comprises a dynamic charging evaluator (DCE) function operative on the virtual network to evaluate a dynamic charging state on the virtual network by evaluating a current traffic state on the virtual network based upon a pre-determined charging policy associated with the service and the at least one customer, and communicating the dynamic charging state to the CSM function; and the CSM function is further operative to receive the dynamic charging state from the DCE function and to instruct at least one of a device traffic controller or a network traffic filter to effect traffic management in relation to the service based upon the dynamic charging state and the pre-determined charging policy associated with the at least one customer and the service. In an aspect, the CSM function is further operative to: establish a unique global user ID based on each at least one customer, UE, and device context; share the unique global user ID with a plurality of local CSM functions; receive context from at least one of the plurality of local CSM functions associated with the unique global user ID corresponding to behavior governed by that at least one local CSM function and associated with the unique global user ID; maintain the received context in association with the unique global user ID; and, share the received context between the plurality of local CSM functions. In an aspect, the CSM function is further operative to: establish a unique global user ID based on the customer, device, and device context; share the unique global user ID with a plurality of local CSM functions; receive context from at least one of the plurality of local CSM functions associated with the unique global user ID corresponding to behavior governed by that at least one local CSM function and associated with the unique global user ID; evaluate the received context based upon a charging policy associated with the unique global user ID to generate a bill; and, charge the customer based upon the generated bill.

In an aspect, the received context is further associated with the at least one service, and wherein the charging policy is further associated with the at least one service; and, wherein the generated bill is charged based upon usage of the at least one service.

BRIEF DESCRIPTION OF THE FIGURES

Further features and advantages of the present invention will become apparent from the following detailed description, taken in combination with the appended drawings, in which:

FIG. 4A illustrates placement of billing functions relative to network nodes in accordance with an embodiment of the present invention.

FIG. 4B illustrates placement of billing functions relative to network nodes in accordance with another embodiment of the present invention.

FIG. 11 is a table illustrating an example for fixed demand charging.

It will be noted that throughout the appended drawings, like features are identified by like reference numerals.

DETAILED DESCRIPTION

Figure 1:
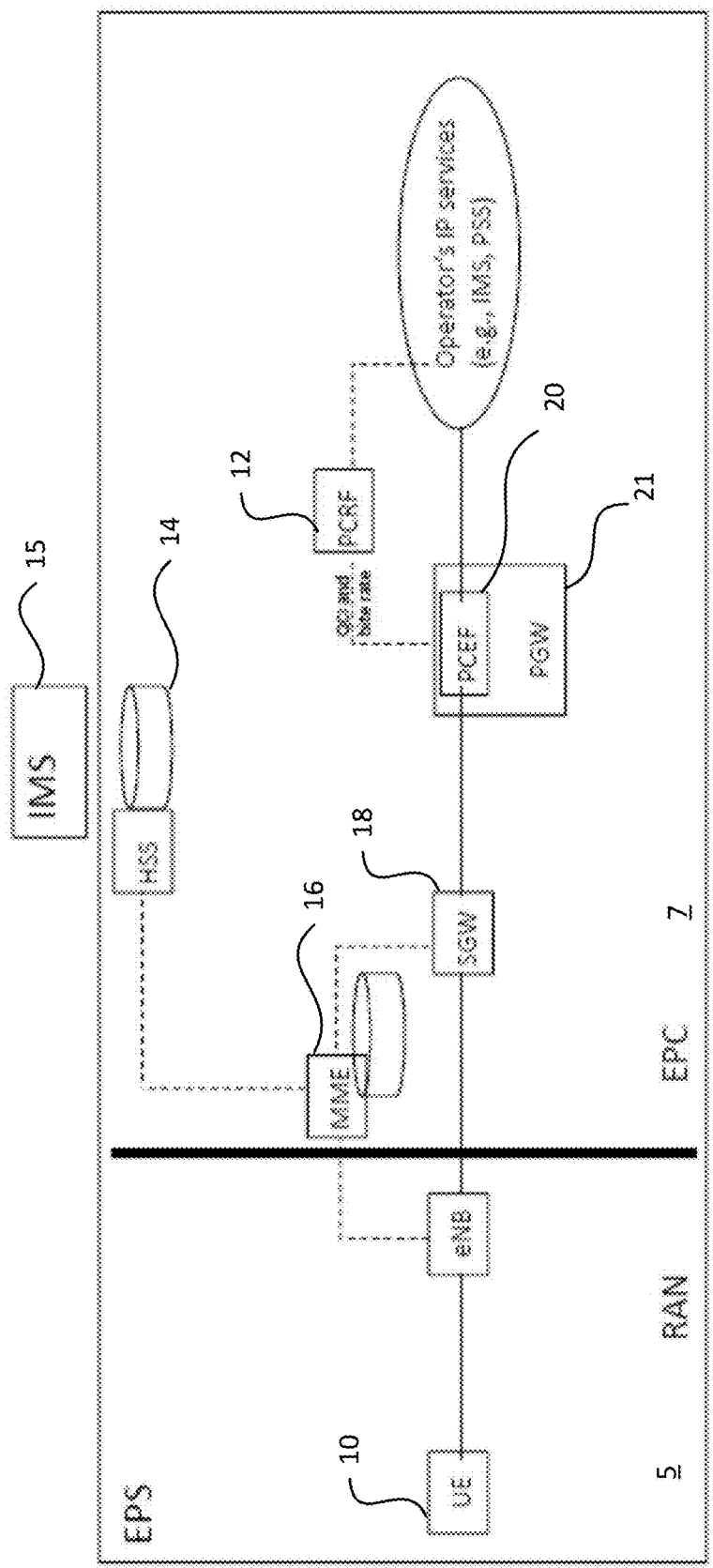
FIG. 1 illustrates a conventional architecture used in 3G and 4G wireless communication networks in relation to service management.

Various acronyms as used herein are defined in the following non-exhaustive list:
AAA: Authentication, Authorization and Accounting
CSM: Customer Service Management
DAM: Data Analytics Management Entity
eNB: E-UTRAN NodeB
EPC: Evolved Packet Core
FPM: Financial Policy Manager
G-CSM: Global Customer Service Management
HSS: Home Subscriber Server
IMS: IP Multimedia Subsystem
KPI: Key Performance Indicator
M2M SP: Machine-to-Machine Service Provider
MANO: Management and Orchestration
MME: Mobility Management Entity
MTC: Machine Type Communication
NFV: Network Function Virtualization
NPM: Network Performance Monitor
NS: Network Service
PCRF: Policy and Charging Rules Function
PCEF: Policy and Charging Enforcement Function
PGW: Packet Gateway
QoE: Quality of Experience
QoS: Quality of Service
RAN: Radio Access Network
SDRA: Software Defined Resource Allocation
SDT: Software Defined Topology
SGW: Serving Gateway
SLA: Service Level Agreement
SN: Service Negotiator
TCSP: Telecommunications Service Provider
UE: User Equipment
VN: Virtual Network
VNF: Virtual Network Function
VNFFG: Virtual Network Function Forwarding Graph
v-s-CM: virtual service-specific Connection Management
v-u-CM: virtual user-specific Connection Management
v-s-SGW: virtual service-specific Serving Gateway
v-s/u-SGW: virtual service-specific or user-specific Serving Gateway
v-u-SGW: virtual user-specific Serving Gateway As used herein, a "network" or "communication network" may service various devices including but not necessarily limited to wireless devices. Such a network may include a radio access portion and a backhaul portion. The network may further comprise various virtualized components as will become readily apparent herein. A primary forward looking example of such a network is a 5G network which is proposed to be reconfigurable and capable of network slicing, as described below. The network may include a number of computing hardware resources that provide processors, memory, and storage to functions executing on the network.

Network slicing refers to a technique for separating different types of network traffic which can be used in reconfigurable network architectures, such as networks employing Network Function Virtualization (NFV). A network slice (as defined in 3GPP TR 22.891 entitled "Study on New Services and Markets Technology Enablers" not yet released) is a collection of logical network functions that supports the communication service requirements of a particular network service. One use of network slicing is in the core network. Through the use of network slicing, different service providers can have distinct core networks that run on the same physical set of network and computing resources. This can also be used to create a virtual network dedicated to particular types of network traffic. It should be understood that this discussion is not intended to exclude the application of network slicing as it applies to the radio access edge of the Radio Access Network (RAN), which may need specific functionality to support multiple network slices or partitioning of resources for different network slices. In order to provide performance guarantees, the network slices can be isolated from each other so that one slice does not negatively affect the other slices. The isolation is not restricted to different types of services, but also allows the operator to deploy multiple instances of the same network partition.

In contrast with having all wireless devices connect with the network through a Mobility Management Entity (MME) determined by a network infrastructure component (e.g. base station, access point, eNB), network slicing allows the instantiation of separate network slices respectively directed toward different network services.

In an aspect, the present invention relates to use of a new function element operative on a slice level to allow for separation of different types of traffic, the different types of traffic potentially having different packet processing requirements and QoS requirements, and to provide different network service level for that slice.

Network slicing may correspond to the allocation of pooled resources to offer different services to different customers or groups of customers, such that different services are supported by different customized virtual networks, where the different customized virtual networks are substantially separate from one another from the customer's point of view. The pooled resources may be commercial-off-the-shelf hardware components capable of configuration through virtualization approaches, such as NFV, in order to support various network functionalities for supporting the operations of the network slices.

The Network Function Virtualization (NFV) framework can be used to define a plurality of virtual network functions (VNFs), each of which can correspond to a function enabling operation of a communication network. For example, a VNF can provide the functions of a router, switch, gateway, firewall, load balancer, server and the like, when executed on at least one computing hardware resource available on the network. The function is virtualized in the sense that it may utilize a set of virtual resources, such as computing, storage and networking resources, when executed on one or more hardware resources rather than utilizing specific dedicated hardware resources. In some instances, the function may be executed on processors across a plurality of hardware resources, to provide distributed functionality across the network.

As such, VNFs may be instantiated on an as-needed basis using available virtual resources supplied by hardware resources available on the network. NFV and virtual network functions architecture is described, for instance, in ETSI GS NFV 001 entitled "Network Function Virtualization (NFV); Use Cases", October 2013 and ETSI GS NFV 002 entitled "Network Function Virtualization (NFV); Architectural Framework", October 2013, for example.

In heterogeneous networks, in addition to a plurality of different types of nodes covering different locations, different infrastructure providers may own different parts of what is considered as an access network (or even parts of a core network). For instance, a Telecommunications Service Provider (TCSP), who provides service to a final customer, such as an M2M Service Provider (M2M SP) or another virtual service provider, may wish to provide a simple network to the final customer. As such, the TCSP will create a virtual network (VN) having virtual nodes and virtual links between the nodes on the existing network.

The M2M SP can access a service available on the network by interacting with the VN. However, the VN (both nodes and links) need to be mapped to physical infrastructure. In some instance, the VN may use a subset of the available physical nodes, rather than all of the available physical nodes on the network. Furthermore, the VN may only employ a portion of the available resources at each physical node of the subset of the available physical nodes used by the VN. It should also be understood that the M2M SP may make use of more than one TCSP, allowing it to create a slice extending across a plurality of different networks, effectively having a network slice that is a superset of the resources of one or more TCSPs.

If certain bandwidth requirements are set for each logical link, then a percentage of an available physical link may be allocated to create the virtual link. This may also include aggregating links to create a logical link of greater capacity than a single physical link.

Network slices are the collection of the allocation of the resources in what may be different networks. A network slice, from the perspective of an infrastructure provider may only include resources in the infrastructure provider network. From the perspective of the M2M SP, the network slice is a substantially seamless aggregation of all network slices that the M2M SP uses which is analogous to the VN. The TCSP deals with seamlessly connecting the different network slices of infrastructure provider resources, along with network slices from the TCSP resources, to create the M2M VN. It should be understood that at various points in time, the total allocation of network slices for different resources may not add up to 100%. If the value is less than 100% it means that the resource is not fully utilized. If it exceeds 100% it may be a network design choice knowing that there is a very low likelihood that all customers will be using a resource at the same time. It should be understood that the size and nature of different network slices can vary with time as new resources come online or as existing resources are re-allocated. The M2M SP may typically be unaware of the changes in the infrastructure."

In some embodiments, network slicing relates to the ability of a network, such as a 5G communication network accessible by wireless devices, to provide multiple logical network slices on demand, with each network slice operating as a substantially separate network viewed as a service. The capabilities and operating parameters of each network slice may be customized to the service requirements for that network slice. Configuration of the network slices may be based on software defined networking, network function virtualization and network orchestration.

In some embodiments, network slicing relates to the ability of a network, such as a 5G communication network accessible by wireless devices, to provide multiple logical network slices on demand, with each network slice operating as a substantially separate network viewed as a service. The capabilities and operating parameters of each network slice may be customized to the service requirements for that network slice. Configuration of the network slices may be based on software defined networking, network function virtualization and network orchestration.

According to embodiments of the present invention, the communication network architecture is based on a Network Function Virtualization (NFV) framework. The NFV Management and Orchestration (MANO) entity is used to instantiate the necessary network functional components to provide the service identified by a Network Service (NS) request. The instantiation of a network service request is described by a Virtual Network Function Forwarding Graph (VNFFG) which defines the set of network functions that are required to provide the requested service. The VNFFG contains a Network Forwarding Path (NFP) that defines a sequence of actions that are to be performed, for example, by a collection of VNFs, to provide the requested service.

An NFV-MANO entity includes an Orchestrator function, a Virtual Network Function Manager (VNFM) function and a Virtual Infrastructure Manager (VIM) function. According to embodiments, the functionality of the Orchestrator function, VNFM function and VIM function can be as defined in standards ETSI GS NFV 001 and ETSI GS NFV 002, for example (see, for instance www.etsi.org).

According to embodiments, the VIM function is configured to manage the Network Function Virtual Infrastructure (NFVI) which can include physical infrastructure, virtual resources and software resources in a NFV environment. For example, physical infrastructure can include servers including processors, storage devices, and the like and virtual resources can include virtual machines. According to embodiments, there can be plural VIM functions within a particular NFV architecture, wherein each VIM function is responsible for the management of its respective NFVI. In application the VIM functions may be executed on processor (s) of one or more of the physical hardware devices distributed across the network.

According to embodiments, the VNFM function can be configured to manage the Virtual Network Functions (VNF) and can manage the lifecycle of the VNFs. For example, the VNFM function can create, maintain and terminate VNF instances, which can be installed on virtual machines that are created and managed by the VIM function. The VNFM function can also be configured to provide fault, configuration, accounting, performance and security management (FCAPs) of the VNFs. In addition, the VNFM function can be configured to scale-up and scale-down one or more of the VNFs which can result in the scaling-up and scaling-down of the usage of the central processor(s) that is providing the computational power for the realization of the VNFs. In some embodiments, each VNFM function manages a separate VNF or a single VNFM function manages multiple VNFs.

According to embodiments the Orchestrator function can be configured to coordinate, authorize, release and engage the NFVI resources by interaction with the VIM function. The Orchestrator function further is configured to create end-to-end service between different VNFs by interaction with the VNFM function According to embodiments, the G-CSM function can be functionally integrated within the Operational Support System/Business Support System (OSS-BSS). The OSS can include functions that support back-office activities which aid in operating a communication network, as well as provision and maintain customer services and the like. The BSS can include functions that support customer-facing activities, for example, billing order management, customer relationship management, call centre automation and the like. In this embodiment, the G-CSM function can communicate with the Orchestrator function using the Os-Ma-nfvo interface, which provides communication between the OSS/BSS and the Orchestrator function.

According to some embodiments, the G-CSM function can be instantiated within the network but external to the OSS/BSS. In this configuration, another interface, which is not defined with the NFV framework, is configured in order to provide communication between the G-CSM function and the Orchestrator function.

Embodiments of the present invention provide for a method for providing Customer Service Management (CSM) in a communication network, such as a next generation wireless network (such as a so called fifth generation (5G) wireless communication network). It will be understood that the teachings of the following disclosure may also be applicable to existing network architectures. The communication network provides at least one service involving one or more terminals serviced by the communication network Embodiments of the present invention provide for a Customer Service Management (CSM) function element in a communication network. The communication network provides at least one service involving one or more terminals serviced by the communication network.

In some embodiments, the at least one service involves a plurality of terminals and/or at least one of the one or more terminals supports a plurality of services. In some embodiments, the CSM function provides charging/billing data for said at least one service. Rules for providing said charging/billing data may be customized to said at least one service. The location of elements that log traffic for the purposes of charging can be made based on the topology of the logical network that provides the service being charged for. For instance, different function elements supporting different services in the same network may make use of different node locations to log traffic (e.g. a QoS function element may be located throughout the VN, whereas charging function elements may be located at end points of the VN.

The CSM functional entities can provide a series of different functions to the services that they support including any of the following functions alone or in isolation: context management, QoS management, QoE management, and services related to modification of a virtual topology for the VN. Charging log elements may be placed based on network-topological aspects of the at least one service. For example, the charging log elements may be located at a RAN servicing a UE accessing the network, and may move to subsequent RAN's to follow the mobility of the UE as it accesses those subsequent RAN's to maintain access to the service while in transit. In some embodiments, the CSM function provides context management customized to the at least one service. In some embodiments, the CSM function provides QoA management, QoE management, or a combination thereof, customized for the at least one service. In some embodiments, a virtual topology of the communication network is adjustable through virtualization, the method further comprising customizing the virtual topology of the communication network for the at least one service.

In current 3G/4G networks, customer service management operations, such as session QoE/QoS control, billing/charging schemes, context management, and the like, are designed for individual users based upon a pre-determined subscription tied to each hardware device. Furthermore, existing networks typically use Static Policy and Charging Rules Functions (PCRF) and support only limited QoS classes. Commonly, the PCRF's are applied to all connections made to the network, with QoS aided through techniques such as traffic shaping which filters by traffic type (e.g. downloaded video data), rather than by service.

In future networks, such as the core network for 5G networks, various new types of services may be provided and more extensive and deeper collaboration among multiple operators may be necessary. It is recognized herein that customer service management for such networks requires design approaches that facilitate these requirements.

In various embodiments of the present invention, customer service management may be customizable for different types of services. In an aspect, a Customer Service Management (CSM) function is operative to provide customer service management on a service level, rather than as a broad device-based application is currently in effect. CSM can allow for customized service negotiation and admission, and may allow for service-customized QoE control. For instance, the CSM may be operative to adjust one or more network parameters during a session to either improve the QoE provided to the service, or to reduce network utilization to conserve resources while still maintaining a minimum QoE level.

Further, QoE may be measured for a "service" involving more than one device, and based on statistics of quality of traffic flowing among the service's devices, service functions and servers within the service VN. The CSM as described herein may further provide for service customized charging and/or billing. The CSM may provide for particular service based charging rules and placement of charging log elements. The CSM may provide for service based service context management, for example, in which different contexts can be defined for different services. The CSM may further be configured in view of a confederation of networks. The CSM may control the collaboration among operators regarding the QoE/QoS, charging, and context update and sharing Service based AAA.

Embodiments of the present invention may enable 5G support service customized CSM which is best suitable to the service characteristics.

3G/4G Service Management

FIG. 1 illustrates a conventional architecture used in 3G and 4G wireless communication networks as it pertains to service management. This architecture is characterized in part by QoS, charging and context being set for an individual UE 10. The architecture includes: a static Policy and Charging Rule Function (PCRF) 12, limited QoS classes, open loop QoS management, and limited (if any) collaboration among operators or different networks. For example, in open loop QoS management, traffic is handled at the bulk level with no evaluation of whether the applied QoS management is resulting in the customer experience meeting the expected QoS level. This makes it difficult to control QoS to the satisfaction of customers, who may not be experiencing a promised QoS level, though the network could provide acceptable service with appropriate QoS management. Furthermore, open loop QoS management may lead to unnecessarily tying up network resources that could be employed elsewhere while still meeting the expected QoS level.

In more detail in relation to FIG. 1, the Evolved Packet System (EPS), particularly on the Radio Access Network (RAN) side 5, may perform bearer management, including session management corresponding to the establishment, maintenance and release of bearers. The EPS may further perform connection management, including mobility management corresponding to establishment and security between the network and the UE 10. The EPS may further perform authentication, such as mutual authentication and handling of security keys.

Further in relation to FIG. 1, the IP Multimedia Subsystem (IMS) 15 may use the Evolved Packet Core (EPC) 7 to support emulated circuit service, such as VoIP, Video, VoLTE and the like. The Home Subscriber Server (HSS) 14 holds subscriber data, such as QoS profiles, access restrictions for roaming, allowed connected PDNs as specified by access point name, and dynamic subscriber data such as Current MME. This data stored in the HSS may typically be static, or slowly changing in response to back-end changes such as customer subscription changes. The HSS may integrate with an Authentication Center (AUC) (not shown in FIG. 1) to create vectors for authentication and security keys. The Mobility Management Entity (MME) 16 is configured, for each powered-on UE 10, to create a context, including static information, such as subscriber information from the HSS and UE capability, and dynamic information, such as a bearer list.

The Serving Gateway (SGW) 18 is configured to maintain a charging log for visiting UEs, and may also perform QoS enforcement. The PCRF 12 is configured to make policy control decisions, such as QoS authorization, Quality Control Index setting, and bit rate decisions. The PCRF 12 may devise QoS rules based on information stored by the HSS 14. The Policy and Charging Enforcement Function (PCEF) 20 is configured to enforce QoS based upon the static PCRF 12, may perform flow-based charging, and IP packet filtering into QoS bearers.

In the above illustrated 3G/4G architecture, all data routed to a UE 10 in its home network passes through the Packet Gateway (PGW) 21. This makes the PGW 21 a logical location to embed traffic logging for the purposes of billing. However, when the UE 10 is roaming outside of its home network, its traffic no longer gets routed through the PGW 21. Instead, the UE's traffic is sent through any number of different roaming SGWs in the roaming network. This makes aggregating the roaming data charges more difficult as the roaming SGWs do not provide feedback to the SGW 18. Monitoring UE traffic requires that all potential SGWs, whether on the home network or a roaming network, through which data may have been routed record and report the chargeable traffic. Accordingly, charging may be performed at the SGW 18 or the PGW 21 depending upon the case. The MME 16 and the HSS 14 handle UE context and information such as dynamic bearers.

Further, the above 3G/4G network architecture has been designed on the assumption that there are only a small number of network operators, and most of the traffic is intra-network traffic with little shared network resources between network operators. In this model an operator typically has a direct relationship with consumers, owns the network infrastructure and provides services to its customers over a set of frequencies that it has exclusive use of. Operators typically form trusted relationships with one or more other selected operators to allow their customers to obtain service in other countries or in regions in which they do not offer service. The ability of a UE to roam on a network is a function of the availability of a trusted relationship between the operators of the visited network and the home network. This allows operators to decide how complex a web of trust relationships should be created. The trust relationships are pair-wise relationships. In order to participate in these arrangements, however, a network operator needs to provide a rather robust infrastructure to allow for billing, authentication, and the like. Smaller providers that only want to provide infrastructure for other network operators, and other such business variations are not properly supported in the context of a 3G/4G architecture.

In 3G/4G networks, there are a small number of different QoS levels that are defined, and because the QoS levels are stored in the HSS 14, and related policies are set by the PCRF 12, they are statically defined. A UE 10 accessing a given service has a defined QoS level assigned to that UE 10 based upon a UE profile stored in the HSS 14 previously assigned to, and associated with, the UE 10. In order to change the QoS level, a user must request a change to their subscription for that UE 10. Furthermore, in 3G/4G networks, control of the QoS level relates solely to the amount of bandwidth that may be allocated in the network. In order to meet the defined QoS level, the network operator can only make gross adjustments to the network in an effort to increase the network throughput, such as by using traffic shaping. Different network loading conditions are not typically considered in the QoS guarantee on a session-by-session basis. Furthermore, a service can associate with multiple UEs 10 which may each require the same QoS/QoE and a network Key Performance Indicator (KPI), based upon their subscriptions and corresponding UE profiles stored in the HSS 14.

Customer Service Management (CSM)

In view of the above limitations, embodiments of the present invention provide for an approach to CSM, which allows for a degree of customization of interactions to enable different types of service offerings. Further, in embodiments of the present invention, CSM is service-based rather than device-based. Embodiments of the present invention may relate to one or more of: bearer management, connection management, authentication, charging, or other functions.

In 3G/4G scenarios, billing is associated with the hardware, i.e. the UE, that generates the traffic, and is typically set as a function of the data consumed and/or uploaded by the UE. This manner of billing is suited to a scenario in which the UE is a mobile device such as a smartphone, is tied with a a single subscribing user, and has a limited range of services and service levels to be accessed. When devices are used or accessed by a plurality of different service providers, in a 3G/4G network, there is no current mechanism to allow for different policies that accommodate differential billing and differentiated service levels.

In an environment rich with Machine Type Communication (MTC) devices, also referred to as machine-to-machine (M2M) devices, such a billing structure may not be appropriate. It may be advantageous to bill the M2M service for the data exchanged with the service, rather than by the UE that originates or transmits that data. For instance, it may be preferable to bill the M2M service in the case where an MTC device generating (exchangint) data traffic with the network is not uniquely associated with a single responsible entity.

In one example, different meters (e.g. electrical meter, gas meters, and water meters) may all make use of a single hub or M2M gateway. The hub communicates with different services, and different service providers may each be responsible for part of the data consumption. As such, billing for traffic generated by the hub/gateway is not directed to the owner of the device, but instead each M2M service provider is billed for their respective traffic. In another scenario, a wide deployment of MTC devices may result in a network provider allocating resources to the devices, even when no traffic is generated. Similarly, a M2M network of devices may rely upon one or more networks for connectivity, but may regularly communicate at a limited service level, for instance off-hours or from specific locations, to provide updates. In these scenarios, it would be desirable for the owner of the M2M network to be the subscriber, and to be billed in aggregate, rather than having a separate subscription for each M2M device of the network. Furthermore, a customized data service and associated charging package would be preferred for such devices which don't transmit priority traffic, such as voice of video communications. In 3G/4G the billing is typically based on the data exchanged, and does not provide a mechanism to financially value a mix of the data type, limited service level, and to bill for the standby resources allocated to the devices when they are not active.

In another scenario a user, such as an enterprise or individual, may utilize multiple wireless-enabled devices to provide, or consume, a service. At least some of the devices may be owned by the user and/or at least some of the devices may be owned by another entity such as a private or public entity, or even by a network owner or operator. The devices are capable of accessing the network and performing their own functions, such as processing, sensing or actuation functions. When the user accesses, or dispenses, a service involving these devices, context management, billing, QoE, and the like, are associated with the service rather than the individual device owners, of which there may be several. Furthermore, a particular UE may employ a different subscription, QoE, and QoS for different services accessed from that UE. Accordingly, the decoupling of the QoE, QoS, and billing from the device, and allocating it to the service, provides a UE with the option of having a plurality of different QoE, QoS, and billing arrangements, each corresponding to a different service accessed by that UE.

Embodiments of the present invention provide for customized service negotiation, admission, and/or QoE control. For example, QoE may be measured for a service involving more than one UE, and based on statistics of the quality of traffic flowing among the service's devices, service functions, and servers, such as within the service VN. QoE feedback may be provided in substantially real time and potentially used to adjust resource allocations in support of a service at a promised QoE level.

Embodiments of the present invention provide for service-customized charging/billing. For example, charging rules and placement of charging log elements may be configured based on a particular service being provided.

Embodiments of the present invention provide for service-based service context management. For example, different contexts may be defined for different services, and the different contexts may be managed on a service-by-service basis.

Embodiments of the present invention provide for a confederation of networks. Some embodiments allow for a seamless service path across different networks. For example, a third party CSM may control the collaboration among network operators regarding the QoE/QoS, charging, and context update and sharing for a service that spans a plurality of networks, each operated by a different network operator.

Embodiments of the present invention provide for service-based Authentication, Authorization, and Accounting (AAA). As such, instead of or in addition to performing AAA on User Equipment (UE), AAA may be performed on a service.

In embodiments of the present invention, a service corresponds to the usage of network resources and terminal resources in furtherance of a desired result. The service may be associated with an application, such as a data collection or terminal configuration application, a user application or usage of the network for communication, or the like, and in some aspects a standby utility to provide at least one of the services. Different devices can access a service with a QoS that may be specified on a per service, UE, and/or UE subscription basis.

Service requirements may involve functions, service types and distribution of traffic. A service can also include:
 a group of flows having a common start or end point;
 a group of data flows where the data shares a common format to enable distributed processing; and,
 a group of data flows that share sufficient common features that, from a network planning perspective, it makes sense to group them together for traffic management.

To address many of these issues, embodiments of the present invention make use of virtualized environments, including virtualized network topologies that are created specifically to enable customized billing and QoS policies. In reference to FIG. 2, a CSM-service makes use of the requirements of a customer to interact with a controller 210 (or set of controllers 210) that can provide Software Defined Network control functions, Software Defined Protocol Functions, Software Defined Resource Allocation functions, Software Defined Topology functions, flow management and traffic engineering. Using the physical infrastructure 215 available (which may include infrastructure from third party providers (of both infrastructure and services)) a virtual network can be created so that all relevant nodes and logical pathways in the virtual network are aware of the QoE requirements of a customer for service A. This virtual network may alternately be described as a network slice. The network slice may be limited to a single service A accessed by the customer's UE, may include more than one of the services accessed by the customer's UE, may include common services accessed by different UE's, may include one or more services accessed by a plurality of UE's assigned to the customer, or other combinations defined by pre-defined criteria (device identity, customer identity, service identity, QoS level, QoE level, etc.)

Instead of relying upon rules created by a Policy and Charging Rules Function (PCRF) and enforced by a Policy and Charging Enforcement Function (PCEF), QoS and QoE are fundamental parts of the defined virtual network architecture. Virtual nodes and logical links are instantiated based upon the pre-defined criteria set by the controller 210 to accommodate the requirements of a service at the outset. This allows the flexibility to effectively provide a virtual network that may be customizable by customer, UE, service, and/or a combination of these factors. Accordingly, a plurality of different virtual networks may be created for each of these criteria, allowing for similar data types to be treated differently, different services from a common UE to be treated differently, and each customer to be provided with a customized QoS, QoE, and billing environment.

In some embodiments, the user plane represents a logical construct for the data flows and control functions associated with a user, organized into customized topology or architecture, which can include virtual functions and physical elements. For example, the topology may be a tree topology, a mesh topology, a mixed topology, or the like. The topology may be customized at least in part to provide a requested service.

In some embodiments, devices may have a variety of capabilities, such as communication capabilities, data processing capabilities, and the like. Devices may be used to concurrently or sequentially support a variety of services, and may be M2M devices or user devices, for example.

CSM QoE Considerations

In current 3G and 4G wireless communication networks, as illustrated by FIG. 1, QoS management is focused on the UE 10 as defined through the user profile assigned to each UE in the HSS 14. As defined in 3GPP documents, each UE 10 is uniquely associated with a subscriber (typically through the Subscriber Identity Module (SIM)). Accordingly, QoS and billing are traditionally considered on a per-UE basis, and are tied to a specific UE 10. QoS enforcement is located at PGW 21 for home UEs 10 and in SGW 18 for visiting UEs. The placement of the QoS enforcement functions was made due to factors that include a network architecture/topology that does not isolate different users on the same network. This results in an architecture that provides a limited number of QoS levels. Available QoS levels typically correspond to predetermined levels of a QoS Class Index (QCI).

Embodiments of the present invention can provide a Quality of Experience (QoE) level in addition to, or in place of, a QoS level. Different QoS parameters on different links of an end-to-end path may result in the same QoE. For instance, the end of a data path is closest to the UE, and may tolerate a lower QoS than a beginning of the data path. Similarly, in congested areas of a network a higher priority may be required to avoid latency.

QoE provides a network operator with more flexibility in how to allocate resources. End-to-end QoE control can be achieved using the method outlined below. In some aspects, QoE control may be service-based, with QoE enforcement performed by a controller 210 which configures end-to-end virtual resources to satisfy the required QoS parameters along the entire link so that the overall link will have the required QoE. The controller 210 is configured to facilitate network resource allocation and deployment for example, in accordance with functionalities such as software-defined networking, network function virtualization, software defined topology, and the like. The controller may be configured to direct a software-defined and software-controlled networking architecture, capable of Network Function Virtualization, for example, by adjusting the software-controlled network to develop a VN based on input from the CSM 220, in view of the current existing infrastructure. Those skilled in the art will appreciate that a software-defined networking controller can be used to manage and create a service-centric access network that has the services and features integrated in various nodes. In prior art networks, specific nodes are dedicated to creating or enforcing policy and ensuring QoS guarantees for all traffic and users. In contrast, the service-specific network performs enforcement of policies at some or all of the nodes which provide the service. The allocation of policy enforcement among nodes may be designed specifically to ensure that the objectives of the network are met in providing that service.

Further, multiple network nodes may be involved in QoS/QoE enforcement for one service due to the distribution of devices associated with a single service. As such, QoS/QoE enforcement is not necessarily limited to a single PGW 21 or SGW 18. Accordingly, in an aspect a plurality of enforcement nodes may be implemented. Thus, a wider variety of requirements may be addressed, at potentially higher granularity than existing approaches.

Further, embodiments of the present invention provide for and/or operate on the basis of a closed-loop QoE principle, which can allow customer independent QoE monitoring of the quality of the delivered services. For instance, enforcement of QoS policies across a slice may be matched to the QoE experienced by one or more customers. Accordingly, where the measured QoE drops below a threshold level the QoS policies may be changed at one or more nodes serving the slice until the measured QoE increases above the threshold level. In some aspects, the threshold level may be high enough that the user's QoE does not appreciably drop below an acceptable level before the QoS policies are adjusted.

Further, customers may be enabled to issue a complaint to the CSM 220, or to re-negotiate service requirements and pricing. In contrast to currently deployed network architectures, where the only mechanism for a customer to evaluate the provided QoS is to ask for network reports, the disclosed methods allow for QoS and QoE evaluations to be performed on a service and provided to the network controllers 210 as feedback. Because QoE relies upon user evaluation of the sufficiency of the service, there are no automated mechanisms in the prior art to address these concerns. By having a series of virtual network components that can be adjusted in response to dynamic feedback, node and link performance can be adjusted to provide the needed QoE, and to ensure that resources are not being unnecessarily deployed. The adjustment of virtual elements can include scaling out, scaling in, scaling up and scaling down (creating new virtual elements, removing virtual elements, increasing the resources allocated to an element, and reducing the resources allocated to an element respectively). If the overall network cannot provide the desired QoE for any of the virtual networks, due to the resource usage by other virtual networks, adjustments can be made to any or all of the networks that are not using their allocated resources so that all customers receive a level of service that best approximates their needs.

In some embodiments, the VN architecture supporting a service is developed based on requirements such as QoE/QoS requirements for that service. As such, explicit policy enforcement may not be required, but rather the VN is created in such a way that the QoE/QoS requirements are achievable and potentially guaranteed. Creation of such a VN may involve allocating appropriate amounts of infrastructure resources at appropriate locations in order to provide a desired QoE/QoS level.

Embodiments of the present invention related to CSM and QoE management comprise establishment of a service oriented VN with QoS guarantees.

Figure 2:
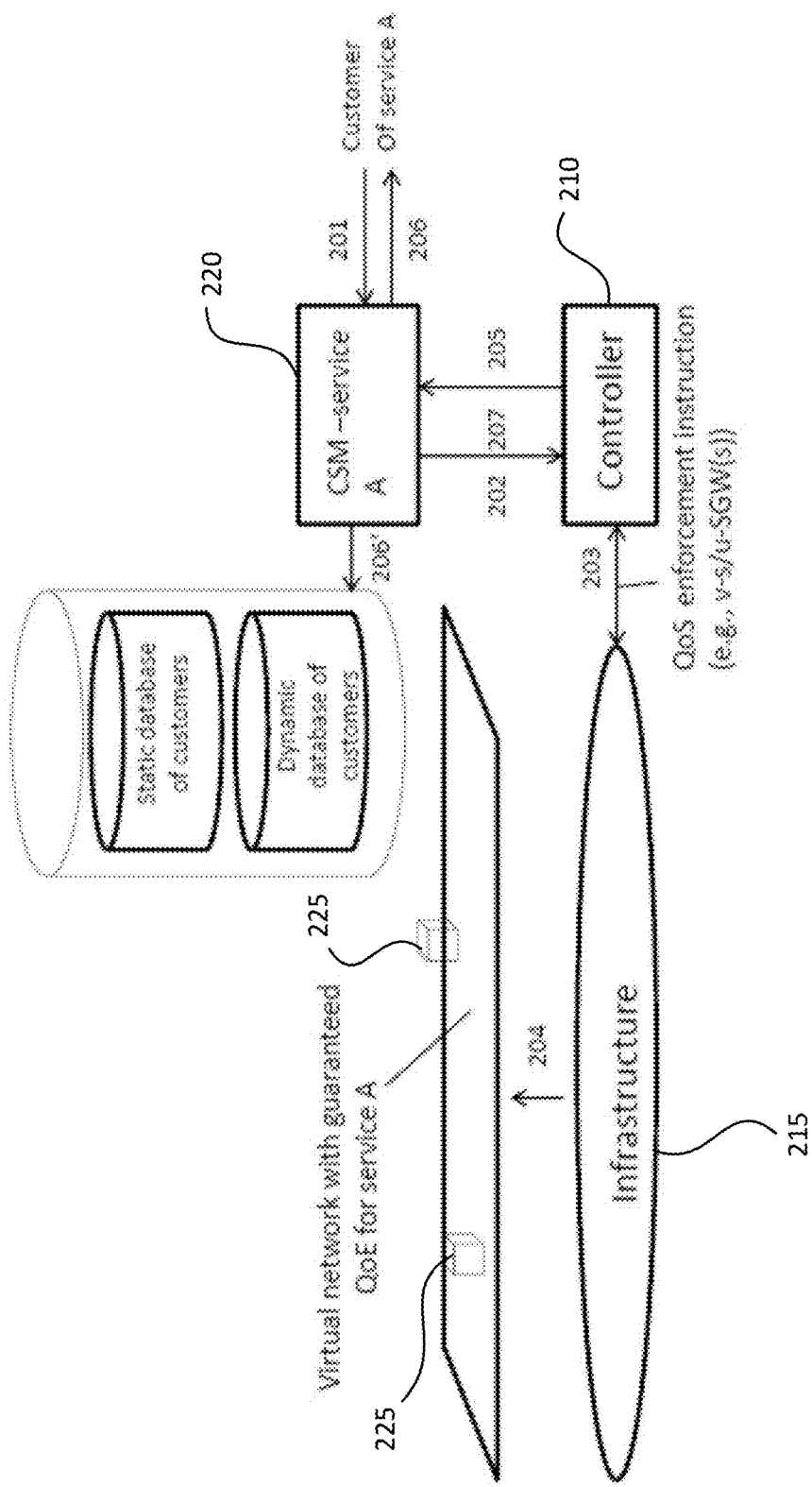
FIG. 2 illustrates a process for a service-based VN establishment in accordance with embodiments of the present invention.

FIG. 2 illustrates a process for service oriented VN establishment in accordance with embodiments of the present invention. The process involves the following operations, with reference numerals as denoted in FIG. 2.

In a service selection operation 201, a customer interacts with a CSM 220, for example, via a defined API accessed by a UE. The service selection operation 201 may include, for instance selection of a service level for one or more services that a customer would like to access. The service selection operation 201 may further define one or more devices, UE's 225, that will access the one or more services. The service selection operation 201 may associate at least one of a customer identity, a device identity, and a service level with that service. The information provided in the service selection operation 201 allows the CSM 220 to develop a series of parameters for VN establishment and charging rules to be established for each of those one or more services, and optionally the customer(s) and device(s).

In VN setup operation 202, CSM 220 interfaces with the controller 210 for a virtual network setup based upon the service selection operation 201. This may correspond to VN admission control. The VN setup instructions allow the controller 210 to map the requirements from the CSM 220 to the available infrastructure 215. This forms the foundation of the virtual nodes and virtual links that allow for the creation of the service-specific VN.

In assignment operation 203, data forwarding and access resource assignment information are used to instantiate the virtual network nodes/virtual functions using the network infrastructure. The assignment operation 203 may occur upon receipt of a service request from a UE, or may occur in advance of the service request for distribution about the network. The assignment operation 203 typically includes QoS/QoE enforcement policies as defined from the service selection operation 201.

In VN operation 204, in response to a service request submitted to the network, a service-specific VN is established using the virtual nodes, functions and links defined by the assignment operation 203. The service-specific VN is established including QoS and QoE policies to be distributed to, and enforced at, one or more of the virtual nodes. The enforcement may include, for instance, evaluating QoE on the VN to meet rate assurances, and/or evaluating bandwidth to enforce rate caps.

In VN report operation 205, the controller 210 informs the CSM 220 of the VN establishment.

In service report operation 206, the CSM 220 informs the customer that the VN has been established, and in update operation 206' the CSM 220 updates the customer database with the service request. As such, QoE and charging rules may be allocated on a per-service basis.

In charging operation 207, CSM 220 employs the controller 210 to configure CMS-charging element(s) and QoS delivery monitoring elements in selected network nodes. In some embodiments, CMS-charging elements and QoS delivery monitoring elements and/or charging elements may be co-located with the virtual service-specific/user-specific serving gateways (v-s/u-SGWs). Various data may also be logged, such as delay data, cloud resources usage data, bandwidth usage data, and the like, and associated with the service. Further, pre-defined parameters for triggering update and service VNs may be provided and/or used. It should be noted that these operations can be repeated when the CSM 220 is informed of a necessary service level change by the customer.

In addition to the above operations, customer charging may subsequently be performed. This may include comparing logged QoS parameters with promised QoS parameters, along with actual service usage/availability, and issuing a bill, credit, or the like in accordance with billing arrangements, whether they are based on transactional billing, billing for a general level of service, billing for availability of a service or other such arrangements. In some embodiments, the collected logged QoS and promised QoS for all services within a charging period may be aggregated and compared, and a bill, credit, or the like is issued based upon at least a comparison of the logged QoS and the promised QoS for those services.

It is noted that, with respect to the above and in some embodiments, customers may directly or indirectly interface with the controller 210. Furthermore, the customer interaction may preferably be through a UE. In some aspects the customer interaction may comprise a machine-to-machine communication between a user UE and the CSM 220 based upon pre-defined parameters set on the UE, for instance by the user.

Embodiments of the present invention related to CSM and QoE management comprising closed loop QoE/QoS management will now be discussed.

In various embodiments, closed-loop management provides a mechanism by which feedback (in some aspects customer feedback) in relation to a service is taken into account when the network adjusts QoE/QoS parameters for that service. In some aspects customers, or their UE, may determine whether they are satisfied with a service level, for instance by measuring an experienced service level against a pre-determined metric, and provide QoE feedback information to the network. This feedback may be automated for example, by monitoring and feedback applications executing on a RAN or on the UE. In some aspects a local copy of a QoE policy may be established on the feedback device (i.e. the RAN or the UE), and a QoE feedback level may be determined by comparing the actual service levels experienced at the feedback location with the QoE policy. In various embodiments, the feedback may provide for a substantially timely QoS adjustment to meet an expected QoE, for example while the service is being provided rather than after the fact.

In some aspects the closed-loop management may provide for measuring QoE at a plurality of feedback locations across the network slice between the service and the customer UE. In the aspects, the controller may receive a plurality of QoE feedbacks, each corresponding to a one of the plurality of feedback locations. The controller may evaluate each of the plurality of QoE feedbacks against a QoE policy, and to adjust one or more QoS policies across the network slice in response to the plurality of QoE feedbacks. The evaluation and adjustment may continue until the plurality of QoE feedbacks meet the QoE policy. In some aspects the closed-loop management may be operative to reduce at least one QoS level within a network slice until at least one QoE feedback falls to, or meets, a QoE feedback target threshold level. In some aspects the closed-loop management may be operative to increase at least one QoS level within a network slice until at least one QoE feedback rises to, or meets, a QoE feedback minimum threshold level. Accordingly, the closed-loop management may be operative to minimize network resources expended to meet a target feedback threshold level, and/or to increase network resources expended in order to meet the QoE minimum threshold level.

Figure 3:
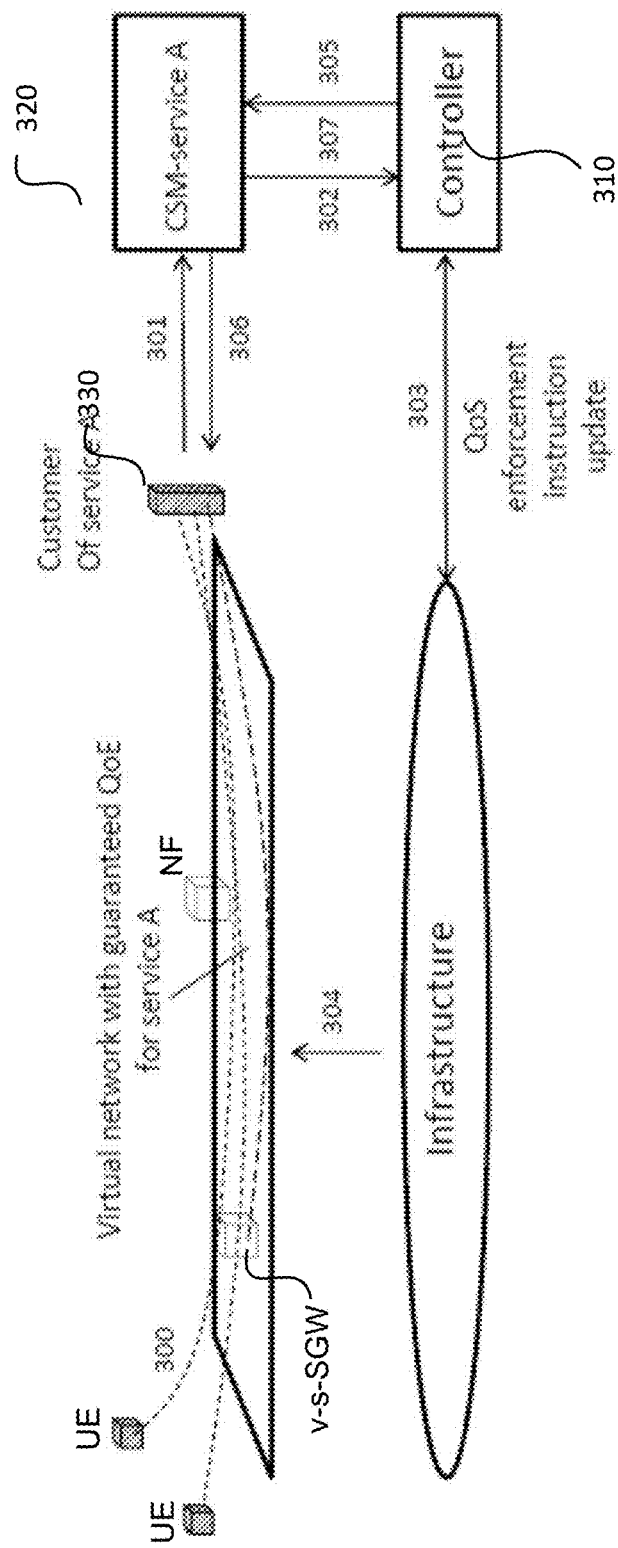
FIG. 3 illustrates a process for QoE/QoS management in accordance with embodiments of the present invention.

FIG. 3 illustrates a process for QoE/QoS management in accordance with embodiments of the present invention. The process involves the following operations, with reference numerals as denoted in FIG. 3.

In logging operation 300, a reporting device 330, which could be any of UE, v-s/u-SGW, a node, or a customer server as illustrated in FIG. 3, can log at least one of QoE/QoS/KPI (key performance indicators) information for a service (such as service A illustrated in FIG. 3). In an aspect, the reporting device 330 may compare the logged information with an established policy. For instance, a UE may log QoE information for a service and compare the logged QoE information with an expected QoE policy.

In an aspect, the reporting device 330 may further report back a result of the information logging and/or the comparison of the logged information with the established policy. For instance, the UE may report back that the logged QoE information falls below a minimum QoE level threshold set by the QoE policy. In reporting operation 301, based upon the logged at least one of QoE/QoS/KPI information, the reporting device 330 may report the logged information to the CSM 320 and/or report a result of a comparison of that logged information with the established policy. For instance, the reporting device may report to the CSM 320 in the reporting operation 301 that QoE experienced was below an expected QoE level set by the QoE policy. In some aspects, the reporting device 330 may include in the reporting operation 301 the logged QoS information. In the aspects, the CSM 320 or the controller 310 may evaluate the logged QoS information to determine whether it meets an expected QoE set by the established QoE policy.

Virtual network setup operation 302, assignment operation 303, VN operation 304, VN report operation 305, service report operation 306, and charging operation 307 correspond to operations 202 to 207 described with respect to FIG. 2, with the exception that in FIG. 3 the operations relate to updating the network infrastructure and the network slice with updated QoS instructions/policies based upon the received reporting operation 301, rather than establishing the VN from the outset. Depending upon the requirements of the update, the virtual network setup operation 302 may not be required if no changes are being made to the foundation of the virtual nodes and virtual links that make up the virtual network (network slice).

1
CSM Charging Considerations

Embodiments of the present invention related to CSM and QoE management comprise charging for a service will now be discussed.

In current 3G and 4G wireless communication networks, the legacy charging function can be characterized as being individual UE-based with a billing subscription assigned to a hardware identifier such as a SIM card. The legacy charging function is typically implemented with a static usage-based charging rule, typically based upon bit volume, or bandwidth usage. based charging rule, or a call time based charging rule for voice calls. More sophisticated charging rules allow for a flat rate on an allotment of data, with bit volume based pricing after the allotment is consumed by the device. The charging function is typically located in the PGW 21 while the UE 10 is within its home network or visiting a non-3GPP network. The charging function is typically located in the SGW 18 while the UE 10 is roaming on another 3GPP network. One skilled in the art will appreciate that this makes real-time billing difficult when the home network operator is not the network to which the UE 10 is connected. The home network operator is somewhat at the mercy of the visiting network operator to determine charging information. As network architectures evolve, it should be understood that the likelihood of a network operator relying upon connectivity from other network providers will likely increase, and thus the ability to have more accurate and timely data for UEs and other terminals connected to a $3^{rd}$ party network is of great value. The current necessity to collect billing information from each SGW 18 in order to remit billing information to a partner network is a detriment to the ability of providing real time control of network events and billing.

Embodiments of the present invention may operate on at least one of the following principles. A service-assignable customized charging function and topology may be provided. Charging may be a function of a number of parameters including one or both of bandwidth consumption and cloud resource consumption. Charging may be based upon a reserve availability of network resources that are reserved and ready to provide a network connectivity to a service. For instance, charging may be a function of resource reservations, the standby utility of the network capacity available to be accessed, with charges levied to a service account even if reserved resources are unused.

The charging policy may be negotiable between the customer and the network operator(s). For example, the policy may be service-based and consider such service factors as upload/download speed, bit volume, delay, reliability, or the like. The policy may specify a priority of data traffic being communicated between UE's accessing the service.

Data accounting may also be performed by different elements on the VN. For instance, a virtual billing entity or service-specific gateway can manage connections to the service across different infrastructure providers and accommodate connection by multiple UE's to the service, and still allow each user, device, or service to have a single billing point regardless of the infrastructure provider. Further, access network and backhaul charges may be different across an individual network slice. Accordingly, a user can choose to be billed by separate billing entities, and specify different access and backhaul entities. Further, billing can depend on whether content is on cached/stored for pre-fetched content.

In some embodiments, charging rules may be updated dynamically based on current conditions, such as network load and/or network resource availability and conditions. Charging rules may incorporate load-based billing, for example, in which costs for network resources increase with demand for said resources.

In some embodiments, one or both of a SLA (Service Level Agreement) model and a per-pay-per-service model may be implemented. As an example, a customer may wish to download a video at the price of $1 per Gb of data. In the SLA model, the general pricing and charging rule may be kept in global CSM-charging, which may be applied to services utilized through the SLA. The CSM may additionally configure the location of a per-service CSM charging control element that may be applied to individual service access. In the per-pay-per-service model, a per-service price and charging rule may be created based on the negotiation between the CSM and customer. The per-service price and charging rule may be a temporary rule, enacted when a service is accessed and deactivated when the service is terminated. In some aspects, a UE may by default operate under the SLA charging rule, but individual services may override the SLA charging rule and have the per-service price and charging rule applied for the duration of that service. Accordingly, in some aspects more than one charging rule may be applied, each affecting different service(s) being accessed by the UE.

In some embodiments of the present invention, as related to CSM and QoE management, M2M charging for services may be provided for M2M applications, with per-service price and charging rules enacted as a party engages the M2M service.

In a first representative charging scenario, exemplified in relation to charging for M2M applications, data is exchanged between a central service (e.g. a customer server available on the network) and one or more local UE's connected to the network. For instance, in an aspect the UE's may comprise utility smart meters. In an aspect, the utility smart meters may be operative to collect data and to forward the data, with or without processing at each meter location, to the customer service. In an aspect, the utility smart meters may be operative to receive data from the customer server and to change one or more operational parameters based on the received data.

In current 3G and 4G wireless communication networks, the legacy charging function would necessitate assigning charging to each utility smart meter, or their connection point to the network. Furthermore, all data exchanged by each utility smart meter would apply to that legacy charging function.

In an embodiment, a service-based billing function may be located at one or more access nodes (i.e. network gateways) in connection with the service provided by the customer server. The service-based billing function may implement a service-based charging rule to charge a customer based on a number of messages being exchanged between the central service and the UE's. Further, the service-based charging rule may be valid for a predetermined duration, or time slot. Accordingly, the customer may be charged based upon the messages sent and received from the central service, or may individually be charged for each UE that accesses the service. In either case, each UE does not need to be assigned a separate SLA for all data communicated to the network, but instead the central service can execute a single SLA and the UE's may operate under that SLA for the purpose of accessing the service. Furthermore, a UE may access more than one service, and a separate service-based charging rule may apply for each accessed service.

In an embodiment, service-based billing may be provided for one or more UE's. In an aspect, the one or more UE's may be mobile devices. In an aspect the mobile devices may comprise smartphones. The service-based billing may comprise:
- A pay-per-service model where a billing function is located at a v-u-SGW associated with the mobile device and/or its user, or a v-s-SGW which serves a plurality of nodes for a single service;
- A combination of a pay-per-service model and a conventional service level agreement based on the UE, wherein at least one of the services accessed by the UE are under the conventional service level agreement and at least one other of the services accessed by the UE are under the pay-per-service model; and,
- An cloud service model providing prepaid access to services, which may in some aspects include reverse charging applied to limited access services.

As illustrated in FIG. 4A, a service-based billing function 400 may be located proximate to node 410, for instance as an element executing on a processor of an access node providing network connectivity to the node 410. In the example of FIG. 4A, node 410 may be the origination/termination node acting as the original sender or final recipient of the data being exchanged (i.e. the UE). In some aspects the node 410 may provide connectivity for one or more origination/termination nodes that may access the network through the node 410. In either case, the service-based billing function 400 may be operative to evaluate the services being connected and to allocate one or more service-based charging rules corresponding to each of the connected services, and to apply each of the one or more service-based charging rules to data exchanged for that corresponding connected service.

A second representative scenario illustrated in FIG. 4B supports network information extraction. In relation to network information extraction, one or more intermediate processes 405 may be established at, or proximate to, intermediate nodes 415 on the network may be initiated to monitor data exchange on a service level. The intermediate processes 405 may further be operative to take action including, for instance, modifying existing network resources, reporting back to a controller, or reporting back to another function such as a charging function. By way of example, the intermediate processes 405 may be operative to conserve bandwidth on the network as a whole by shaping traffic on a service-level. By way of example, the intermediate processes 405 may be operative to provide congestion-based pricing by evaluating a congestion level on the network at the intermediate node 415, and to assign a congestion level to that service. The intermediate processes 405 may further be operative to report the assigned congestion level back to a service-based charging function corresponding to that service.

The second representative scenario may correspond to systems configured for network monitoring or in-network information processing, or a combination thereof. In an aspect, such systems may be, for example, sensor network applications, potentially incorporating data fusion. In this aspect, a service-based charging function may be provided at or proximate to each processing point, for example, in relation to v-s-SGWs of the services. A service-based charging rule implemented by the service-based charging function may be based for example, on the amount of cloud resource consumption plus the bit-volume or bandwidth consumed at that processing point. Further, the service-based charging rule may be valid for a predetermined duration.

Figure 4C:
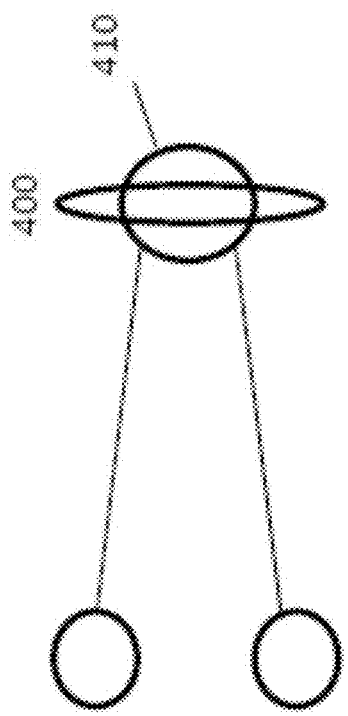
FIG. 4C illustrates placement of billing functions relative to network nodes in accordance with another embodiment of the present invention.

A third representative scenario illustrated in FIG. 4C related to charging for local measurement and control applications, for instance M2M applications for industrial control, including event monitoring and control, or the like. As illustrated in FIG. 4C, a service-based billing function 425 may be located proximate to the monitoring and/or control node 420. The monitoring and/or control node 420 in communication with sensor node 430 providing with data measurement/collection and actuator node 435 providing control actions over a process. In some aspects, the measurement/collection node 430 and the actuator node 435 may comprise a same device. In some aspects the measurement/collection node 430 and the actuator node 435 may comprise separate devices. In some aspects a plurality of sensor nodes 430 and/or control nodes 435 may be provided.

In an aspect of the third scenario a service-based charging function 425 may be provided at the v-s-SGWs which are co-located with the monitoring and/or control node 420. A service-based charging rule implemented by the service-based charging function may be based for example, on the amount of cloud resource consumption plus a commitment to ensure that the network latency for receiving information from the measurement/collection node 430 and transmitting control information to the control node 435 is below a latency threshold to permit sufficient reaction time to detect and respond to an event. The latency threshold may be based, for instance, on one or more process dynamics of the process being monitored and/or controlled. Further, in some aspects the charging rule may be valid for a predetermined duration or time of use.

CSM Context Considerations

Embodiments of the present invention relate to providing a CSM Context, as described below.

In current 3G and 4G wireless communication networks, 3G/4G context maintenance can involve the participation of the HSS 14 and the MME 16. The HSS 14 may hold static subscriber data, for example, including a QoS profile, access restrictions for roaming, allowed connected Packet Data Networks (PDNs), as specified by Access Point Name (APN), and UE capability. The HSS 14 may also hold dynamic subscriber data, such as the current MME 16 in use for a user, and potentially vectors for authentication and security key operations. The MME 16 may also hold static subscriber data, such as a local copy from the HSS bearer list, as well as dynamic subscriber data, such as a bearer list, security key data, and the like. As such, in such current networks, the CSM context includes information descriptive of a current service and/or session status, a key in use, and a static profile.

In embodiments of the present invention, the CSM context may include information descriptive of a current service and/or session status, a key in use, and a static profile, and additionally includes information descriptive of customer behaviour and/or service behaviour. Accordingly, in the embodiments a service-based CSM context is provided, that is tied to the service, rather than a particular UE. Behaviour may relate to user movements or habits, periodic and/or predictable interactions with the network, known or predictable schedules, or the like. In one example of such behaviours, a particular user's behaviour profile may include historically derived information including that the user becomes active at a given time each morning (within a margin of error) and typically is located at a first location at this first activity time. After entering the first activity time, the user enters a higher mobility state and follows a known path to a second location, and accessing a known sequence of access nodes. The high mobility state typically starting at a given start time, or range of start time, and ending upon arrival at the second location at a given end time, or range of end time. This time and location based behavior may also be correlated to data consumption. By knowing the aggregated behaviour of a large number of users, network planning can be undertaken to ensure that adequate resources are allocated in different regions at different times to ensure that QoE guarantees are met but without requiring an unnecessary over-provisioning of the network. The aggregated behaviour may also be used to predictively allocate network slices to services operating during this time window, and within this geographic region. The aggregated behaviour may further be used to predictively decrease QoS levels during this time window and within this geographic region to the lowest QoS level that will meet the QoE guarantees to conserve network resources. In an aspect, the aggregated behaviour may be used to set charging levels for M2M applications that may preferentially be scheduled to occur outside this time window in order to conserve network resources.

In various embodiments, a service-based CSM context may be provided in which a different context management operation may be provided for each service available on the network. Such a service-centric model can be contrasted with a UE-centric model, in which each UE is associated with a specific context.

In an aspect, a UE may access a service available on a network under a service-based context associated with that service. In an aspect, multiple services accessed by a given UE may each be associated with a different context. Accordingly, a UE accessing a plurality of services may do so under a corresponding plurality of service-based contexts. In an aspect, a UE may operate employing a combination of UE-based context and serviced-based context. For instance, a UE may have an assigned UE-based context for voice communications and particular data communications. The UE may further operate using one or more service-based contexts to connect to a corresponding at least one service available to the UE. In an aspect, a service accessible to multiple UEs may be associated with a single context for common use by the multiple UEs.

In various embodiments, the service-based CSM context includes information indicative of a device and/or customer service behaviour context. This information may be indicative of a service use pattern based upon one or more of: a temporal network use pattern, a traffic load pattern, a spatial network use pattern, and/or a combination thereof. The temporal network use pattern may indicate hours of a day and/or days of a week or month when network access is required by a service. The traffic load pattern may be indicative of data transmitted and/or received in accordance with the service. The spatial network use pattern may indicate potentially time-varying locations typically associated with the service, for example, in association with a user's commute from home to office. In some embodiments, these contexts may be logged and obtained from entities such as the virtual user-specific Connectivity Manager (v-u-CM), v-s/u-SGW, or the like. In some aspects, the CSM context provides the availability for a user to change the device capability by engaging a new service-based context In various embodiments, the CSM context corresponds to collaborative customer context maintenance, in which a third party may manage a per-service context across each network that includes its CSM-context for a service. Accordingly, the third party may provide a service that spans multiple separately operated networks, decoupling the service from a particular network. As such, where a service utilizes resources across the multiple separately operated networks, CSM context information may be collected from, and shared between, these networks within relation to the CSM context so that global patterns may be discerned and addressed for that context.

Embodiments of the present invention relate to providing a CSM Context, particularly in relation to M2M service context management. In various embodiments, a service may involve a plurality of devices such as M2M devices. In some aspects the plurality of devices may each communicate with a central service provider, such as a server. In some aspects, the plurality of devices may inter-communicate with or without a central service provider as an intermediator. Furthermore, the plurality of devices may each have a different capability. In some embodiments, a service may involve multiple networks, for example, with one or more of the plurality of devices residing in each of the multiple networks. As such, devices such as M2M devices may be distributed over a potentially large area extending across multiple networks and still be associated with, and within the same service-based context, to access the same service.

In order to address such scenarios, some embodiments of the present invention provide a particular architecture, in which a third party maintains the service context, and each network that serves the underlying customer creates a local CSM-context function element based upon static context information obtained from a common CSM-context provider. In some aspects, the CSM-context provider may comprise the third party.

In an aspect, the third party maintaining the service context, potentially across multiple network operators, may track service parameters such as the user's QoE, encryption key parameters, device capabilities, and behaviour parameters such as the service's temporal and/or spatial network use pattern and the service's traffic load pattern. The spatial network use pattern may correspond to an individual commuter pattern for example. Such spatial network use patterns may only be applicable where terminal devices are in motion, or where stimuli which trigger stationary terminals are spatially varying such as for time-variable utility reporting. The third party may further collect context information from underlying CSM-context including, for example, sending context data to a Data Analytics Management Entity (DAM) for analysis.

As noted previously, a service in accordance with embodiments of the present invention may span multiple networks accessible to devices residing in different networks. As such, devices may be distributed over a potentially large area and still be associated with the same service. A service may involve multiple devices, including UEs, with potentially different capabilities. In some embodiments, each network that serves an underlying customer of a service is configured to create a local CSM-context function element and to download static context information from the CSM-context provider. A resource allocation element such as a Software-Defined Resource Allocation (SDRA) element may use this information to allocate resources in furtherance of providing the service to the customer. Resource allocation may involve participation of an access link scheduler at the lowest level of SDRA hierarchy. Further, records may be collected from v-s-SGWs and v-s-CM for behaviour context update. Yet further, relevant information may be forwarded as CSM-context information to the CSM entity which is located in a logical network layer above the SDRA.

Figure 5:
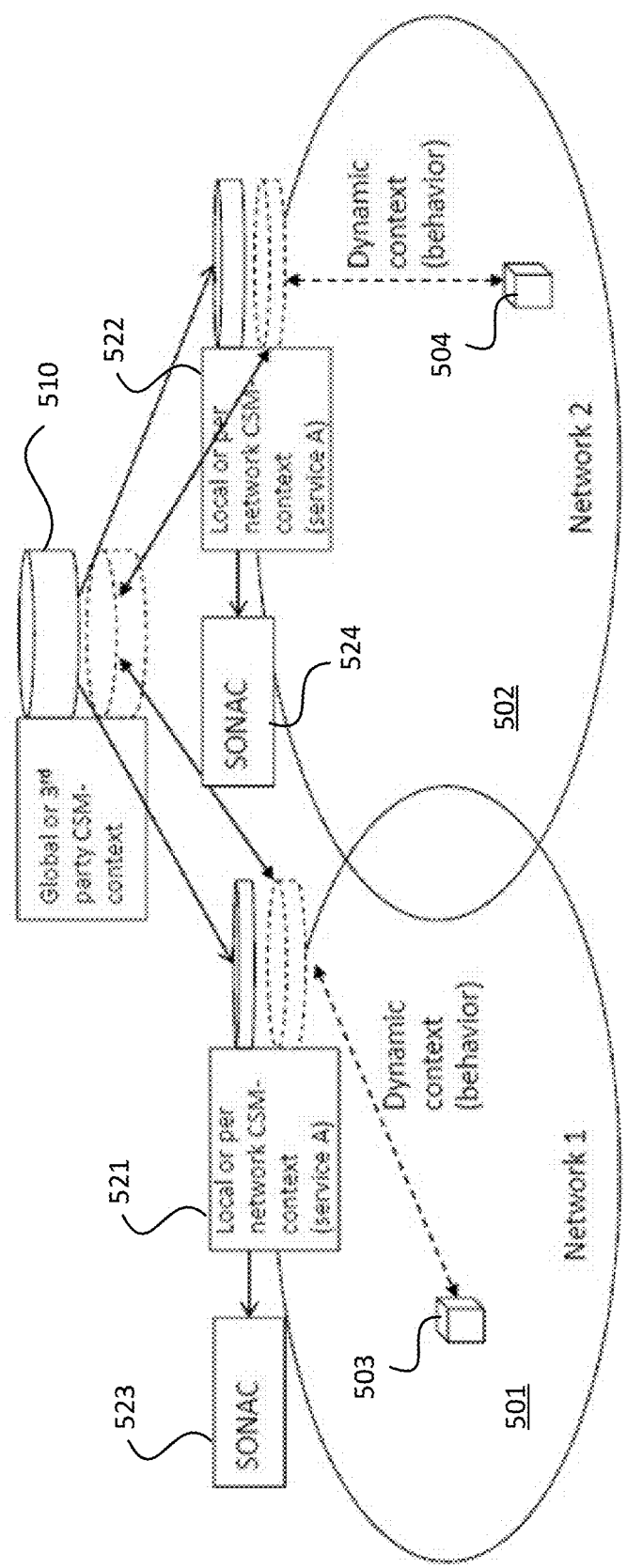
FIG. 5 illustrates collaboration between a pair of networks in furtherance of collaborative context management in accordance with embodiments of the present invention.

Embodiments of the present invention relate to collaborative context management between a plurality of networks. FIG. 5 illustrates a simplified example of collaboration wherein the plurality of networks comprises a pair of networks 501, 502 used by a pair of UEs 503, 504 to access a common service A. As illustrated, a global or third-party CSM-context 510 creates svirtual per-service local CSM-context function elements 521, 522 at the network 501, 502 serving each customer UE 503, 504 at the VN establishment. The VN resources are assigned concurrently or previously. The CSM-context 510 comprises a "global" service-based CSM-context that is operative to serve elements across the networks 501, 502. The CSM-context 510 also downloads service context to the local CSM-context elements 521, 522 of the networks 501, 502. The behavior context is then logged by the CSM-context elements 521, 522, for example continuously, and the CSM-context 510 is periodically updated by the CSM-context elements 521, 522. In some embodiments, the virtual CSM-context element 521, 522 of each network 501, 502 can be eliminated once the UEs move out of the networks 501, 502 and at the termination of a service.

The logged behavior context may be collected and stored in a local database at the local CSM context elements 521, 522 for use at the network level, and further may be forwarded to the CSM context 510 for use at the service level spanning the networks 501, 502. Accordingly, traffic within a network 501, 502 may be managed based upon traffic patterns and behaviors recorded in the local logged behavior context, while at the same time a global context is stored by the CSM context 510 to permit mutual access and utilization by the networks 501, 502. In an aspect, the CSM context 510 may maintain a unique global user ID (a user credential associated with the device, user, and device-context). The global user ID may be shared between the local context elements 521, 522 to allow for logging and tracking of dynamic context at the local level, associating the logged dynamic context with the global user ID, and uploading logged dynamic context in association with the global user ID to the CSM context 510.

In some embodiments, collaborative context management allows different networks to collaborate with each other on a service-by-service basis in order to adequately support the service. This may facilitate providing a global view of the user, service and/or customer context. For example, in the case of electrical meters, it may be possible to adequately discern network traffic pattern variation only when traffic associated with the service is viewed globally across multiple networks. Collaborative context management may provide a mechanism to exchange such context.

Also included in FIG. 5 are the SONAC 523, 524 operating in conjunction with the local CSM-context elements 521, 522. As used herein, "SONAC" refers to a Service Oriented Network Auto Creation technology, which can be implemented as a set of network control functions or a software controller. In various embodiments, SONAC includes enabling technologies, such as Software Defined Topology (SDT), Software Defined Resource Allocation (SDRA), and Software Defined Protocol (SDP). In a given SONAC instance, any or all of SDT, SDRA and SDP may be used. Which of these technologies are included in a given SONAC instance can be controllable. In embodiments where the network makes use of virtualization, some of these SONAC functions may reside in an orchestrator.

Figure 6:
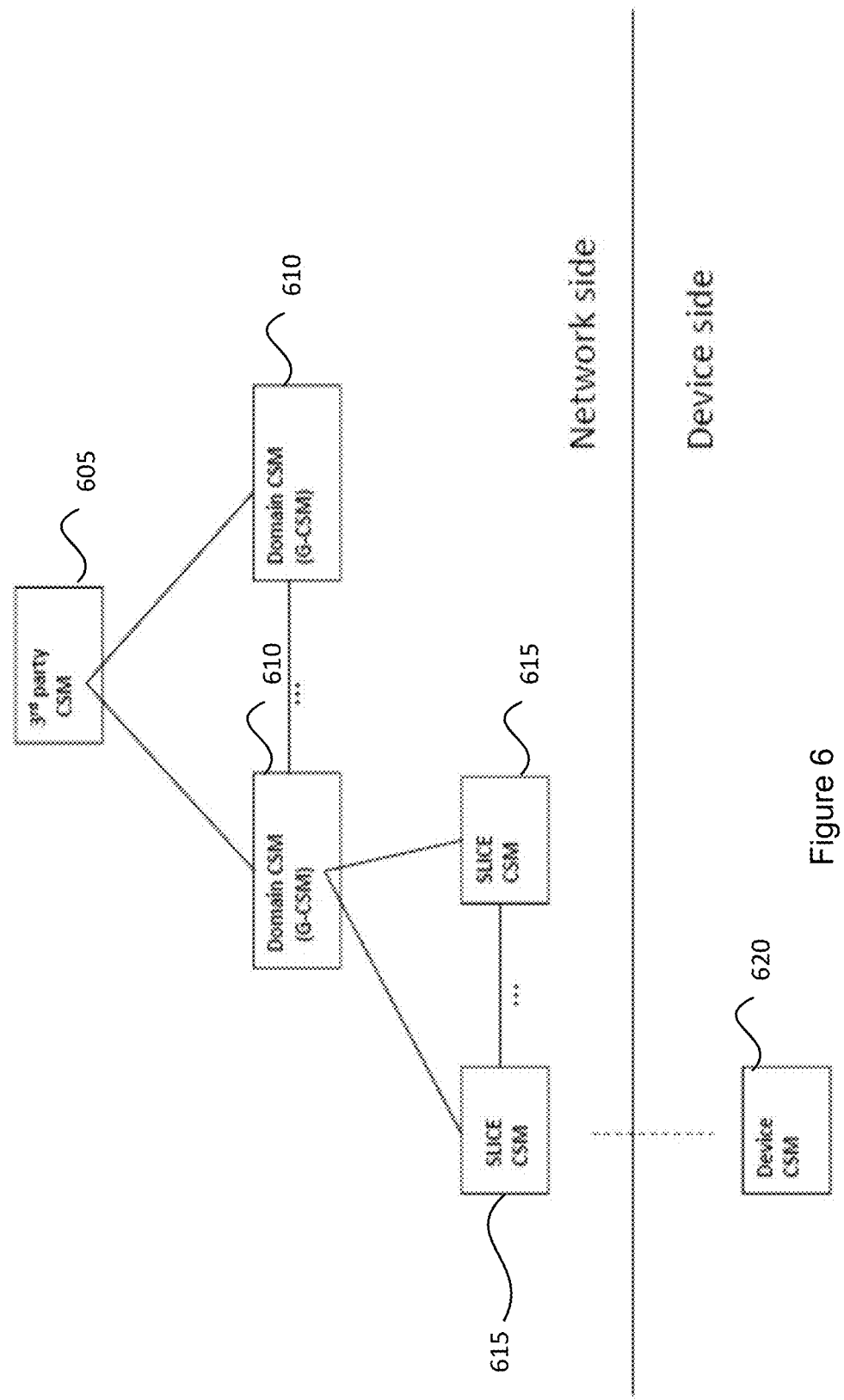
FIG. 6 is a block diagram illustrating the hierarchical logical topology of the CSM entities.

FIG. 6 is a block diagram illustrating the hierarchical logical topology of the CSM entities. As shown in FIG. 6, embodiments can include many instances of CSM entities, each providing different aspects of CSM. A third party CSM 605, acts as an intermediary to manage the CSM requirements across networks and facilitate information exchange between network operators. The third party CSM 605 may be operative to interact with domain-specific Domain CSM entities 610, which globally control CSM functions within a domain, and are therefore also referred to as Global CSM entities (G-CSM). Within a domain, a plurality of Slice CSM entities 615 is established. The Slice CSM entities 615 each operative on a slice level. The Device CSM 620 operates on a UE to provide feedback on the device-level experience to the Slice CSMs 615.

Each of these CSM entities may be virtualized entities supported by a data center, or across a number of data centers. The CSM entities may comprise, for instance, software that, when executed on processors of the data center(s), render the data center(s) operative to perform the function(s) of the CSM entities. In some aspects, the CSM entities may be instantiated as software executing on processors of local network infrastructure elements, which may provide for distributed CSM functionality provide by those local network infrastructure entities. Device CSM entities 620, may include software applications resident in, and for execution on processors of, UEs for facilitating communications with slice CSMs 615 or G-CSMs 610. As but one example, which will be discussed below, in some embodiments a network may use dynamic charging for a service, in which usage charges may vary based on conditions such as time of day, geographic area, current network usage, etc. In such embodiments, the device CSM 620 can notify a user that the service charges have changed.

Figure 7:
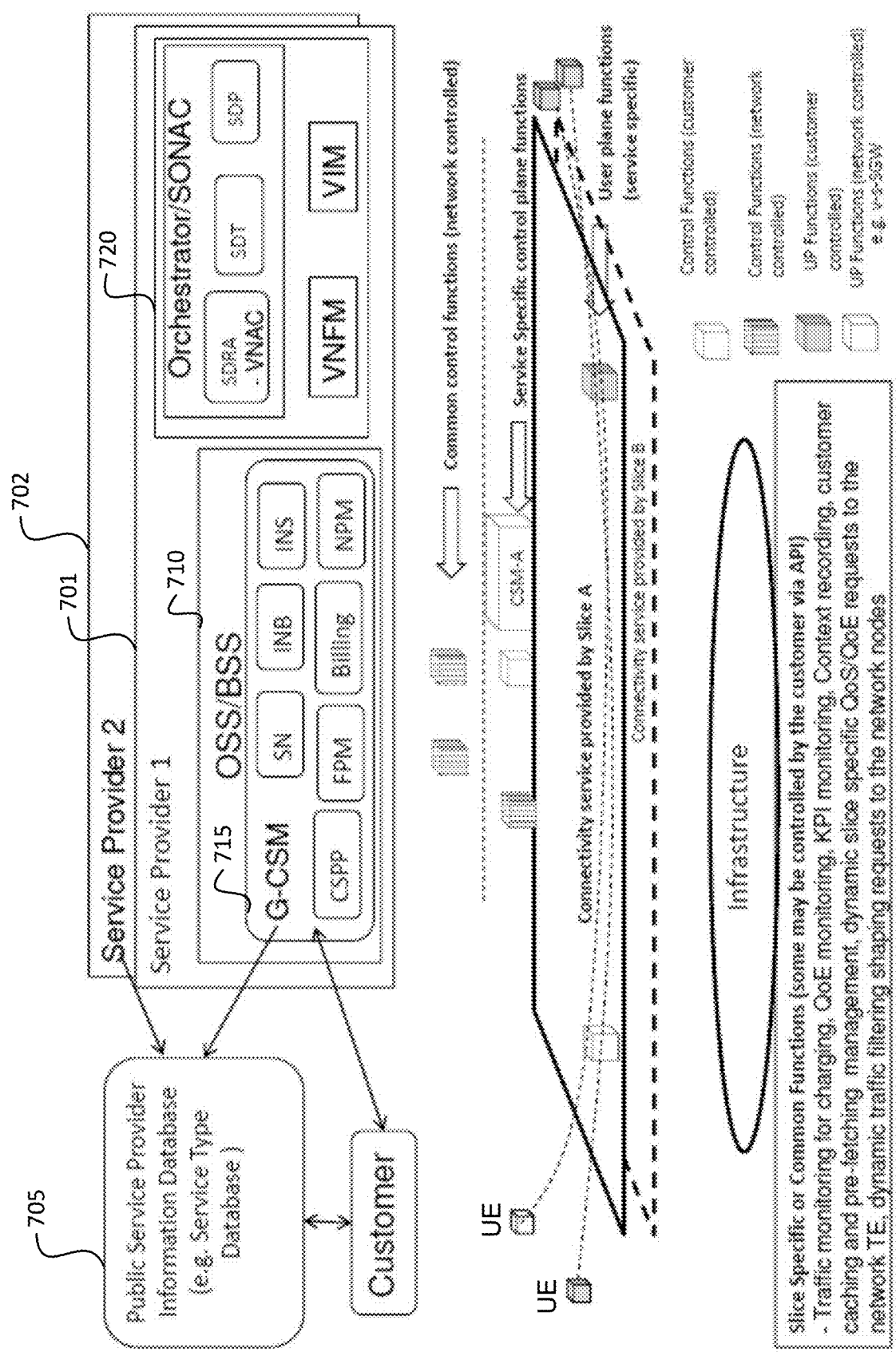
FIG. 7 illustrates network elements for providing customized service for two Telecom Connectivity Service Providers (TCSPs), according to an embodiment.

FIG. 7 illustrates an embodiment where a public service provider Information Database 705 retains and serves relevant information supplied by twoTelecom Connectivity Service Providers (TCSPs) 701, 702 to the public (e.g. customers of the service providers 701, 702).

Each of the TCSPs 701, 702 has its own network including OSS 710 and MANO 720 functions. Each OSS 710 includes a G-CSM entity 715, which provides global CSM functions, and instantiating per-service or per-slice CSM instances (via the MANO functions). The G-CSM 715 is responsible for interactions with the customer during establishment of a new customer service including preparation of any service level agreement (SLA), interaction with the orchestrator 720 to obtain optimum solutions, network monitoring, SLA adjustments, and billing. Each G-CSM 715 also interfaces with the Information Database 705, which is a database of service types offered by the service providers and the associated policies and negotiation steps for each service type. A customer subscribing to a service will look up the service types from this database and request a service from the G-CSM 715. For instance, the Information Database 705 may offer video distribution, high-level security services, lists etc. Customers are able to check the Information Database 705 to see whether services are available to access the G-CSM 715.

In some embodiments, the G-CSM 715 also includes the following elements. A Service Negotiator (SN) is responsible for negotiation with customers while obtaining capability assessment from VNAC and financial policies from the Financial Policy Manager (FPM). The FPM maintains the financial guidelines for business creation, optimization aspects for profitability, and pricing, considering market situations and competition. The G-CSM 715 can also include a Network Performance Monitor (NPM) which stores the performance history of the network dynamically updated by the service slice. This is used to calculate the charges including penalties and to re-negotiate SLAs. The G-CSM 715 can also include a Customer Service Profiles and Policies (CSPP) element which includes the type of service profiles offered by the network as well as stores the SLA details including policy aspects once a service is initiated.

The service provider also includes a MANO entity 720 which can include an orchestrator (or alternatively a SONAC), and VNFM and VIM functions, as described above. The orchestrator, for example, the SDRA function, includes a Virtual Network Admission Control (VNAC) function, which assesses whether the service request can be provided, the resource cost for so doing, and indicates negotiation options or considerations (e.g. if extra resources are required).

Also included are Slice Specific or Common Functions (some may be controlled by the customer via API), such as traffic monitoring for charging purposes, QoE monitoring, KPI monitoring, context recording, customer caching and pre-fetching management (including case performance), providing dynamic slice specific QoS/QoE requests to the network traffic engineering (TE), providing dynamic traffic filtering and/or shaping requests to the network nodes, etc.

Each service can be provided by a network slice instantiated to provide such a service. Accordingly, a first connectivity service can be provided by slice A and a second connectivity service can be provided by slice B. Network controlled common control functions, service-specific control plane functions and service-specific user plane functions are established. It should be noted that Slice A and Slice B can be provided by the same service provider or by different service providers.

In some embodiments, the OSS 710 includes an infra-structure buyer (INB) and infra-structure seller (INS), for buying and selling infra-structure resources as each service provider need not necessarily own all of the infra-structure elements necessary to provide the service-specific slices. If a service is only needed for a short period of time, TCSPs 701, 702 may acquire short term access to infra-structure resources from other TCSPs. Alternatively, if a service is needed for a long duration and an offering TCSP does not own sufficient resources, it may be financially beneficial for the TCSP to acquire the necessary resources from an infra-structure provider (InP). In other embodiments the INB and INS functions can be hosted by the orchestrator or some other MANO function.

Figure 8:
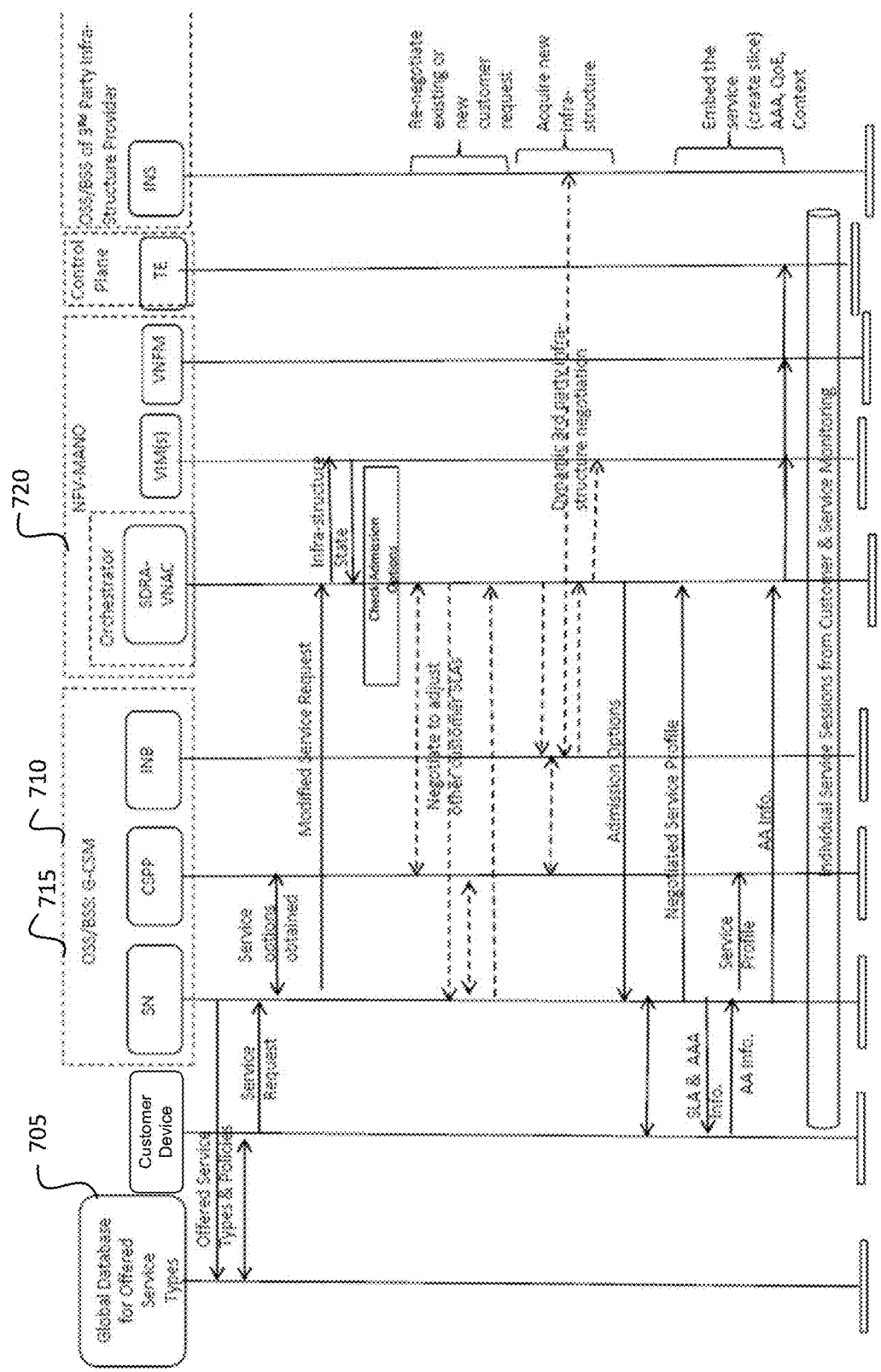
FIG. 8 illustrates a procedure for customer negotiation for a connectivity service, according to an embodiment.

FIG. 8 illustrates an embodiment of a procedure for customer negotiation for a connectivity service. While the procedure refers to a "customer", the exchange is between devices, ie between a server and a requesting UE, and may take without active participation of a user of the UE. In brief, an exchange of information takes place to determine what service options are available, which leads to a negotiation, or re-negotiation for a new or existing customer request. The service provider 701, 702 then allocates the required network resources to provide the service, and optionally acquires any missing resources for allocation to provide the service. The resource acquisition can include acquiring new infra-structure, possibly from another TCSP if the service is time-limited or from an InP if the service is sufficiently long in duration. The service slice is then created using the allocated resources.

In some embodiments such a procedure can include the following steps:
  Preparation of information database 705 for services offered by the network:
    G-CSM 715 of the operator 701, 702 updates all the service types the operator 701, 702 can offer with the policies, coverage areas, traffic input methods, charging methods to the information database 705 (in an aspect consisting of information related to multiple network operators).
  Customer making the service request:
    Customer searches the information database 705 to find a matching service offer(s) and makes a service request to an interested network operator's Service Negotiator (SN), which in some embodiments is part of the G-CSM 715.
  Network negotiating the service provision
    The G-CSM 715 compares the service profiles and policies stored in CSPP and if matches with a service profile or several service profiles, it will send them to the VNAC in the orchestrator 720 to check the admissibility or to provide options for further negotiation.
    If the request does not match any serviceable profile in the CSPP database, the system either negotiates with the customer to change the request according to the serviceable profile, or failing that, rejects the request.
  The SN in (G-CSM 715) sends the request, which may be a modified request due if renegotiation took place to VNAC for admission.
  If VNAC decides that the service can be admitted under the given requirements that will be informed back to the SN and SN will set up a SLA with the customer. However, if the current resources are not sufficient, the method proceeds to acquiring additional network resources (i.e. negotiate with a third party to acquire new infrastructure).

SLA will also include how to do AAA with the network operator (SN). Required AAA information (e.g. device ID database, keys, capabilities, service types and priorities assigned to different devices.) will also be given to the SN.

Once a customer accepted the terms, the SN will store the profile as an accepted profile and inform VNAC to embed the service (i.e. create slice)

Inform SONAC to find the VNF placement, SDP etc and inform VNFM and VIM to create VNF and prepare infra-structure to allocate virtual resources;

Establish proper AAA mechanisms;

Establish QoE guarantee measures using SONAC elements such as TE, traffic shaping and monitoring function;

Charging mechanisms and associated traffic monitoring;

If resources are not sufficient:

VNAC may inform all the alternative options to the SN:

In an aspect, additional resources may be acquired: SN request to INB for the required resources; The INB can negotiate with a third party infrastructure provider (InP) to acquire additional resources/infrastructure support; If terms are acceptable, ie pricing profitable within QoS agreement with the requesting customer, the INB can accept provision of the additional resources.

In an aspect, current resources may be reduced to meet current requirements: SN may review the VNA list to identify the best option and renegotiate with an existing customer or the new customer based on the options; The INB may further re-negotiate with the InP to either release acquired resources, or to provide network capacity.

In some embodiments, the architecture which includes OSS/BSS 710 under a MANO architecture includes open and consistent interfaces to allow for:

Automation, self-service operations at service and product level;

Adaptive automation;

Service usage driving on-demand resource requirements;

Triggering feedback to mgmt. functions;

Analyze and make changes to;

Orchestration;

Policies can guide the decisions required to change all or part of the system to perform a given function;

Personalized services that are easily configured by the operator or end-user at the service or network resource layer; and Technology driven innovation.

Customized service types will now be discussed according to embodiments. Six service types can be organized in three main categories: Connectivity service delivery; asset provider, and data analytics. Connectivity service delivery can be for a single session, SLA based for VNs, or offer a network topology as a service (NaaS). A first customized service type relates to a single session connectivity requirement, which may involve a single device or multiple devices (e.g., video conference for one time use, but may stream to one device or to multiple devices). This service type can include online charging or reverse charging or be offered as a free (e.g., basic) service. Second and third customized service types relate to SLA based Virtual Network connectivity services, which can be for single or multiple users (devices) covering specific geographical areas in specified times (i.e., demand distributed in time and space). A second service type includes services for single applications with similar QoE requirements/guarantees; for example, a single slice for a vertical service (alarm company, video delivery). A third service type includes services for multiple applications (which may have different QoE requirement guarantees) offered as a single aggregated service; e.g. multiple sub-slices for a virtual network slice with an aggregate traffic cap.

A fourth customized service type relates to network topology management as a service (NaaS). This can offer a particular virtual topology for a network segment with specific link and node performance capabilities, which can be offered with or without control (e.g., resource/link/routing/scheduling control). A fifth customized service type relates to infrastructure providers offering specific resources (hardware, e.g. links, nodes, storage) either with or without full controlling capability The document "NGMN 5G White Paper," by the Next Generation Mobile Network Alliance, dated Feb. 17, 2015, provides example details of potentially relevant business models. A sixth customized service type relates to providing Data analytics as a Service (DaaS). For example, a $3^{rd}$ party may require specific user network information (with the consent of the network/users). DaaS allow for a control plane node to provide data analytics on traffic flows and the network topology. Changes in the network topology can be modeled to allows for improved communication between elements associated with particular clouds and bandwidth capacity; and infrastructure utilization, capacity and loads. The data analytics can include information related to per slice or per VN resource utilization and loading, as well as per slice or per service QoE data. Related network functions may be instantiated as a specific slice or with each existing slices facilitated by slice owners Further embodiments relating to QoE/QoS management, with examples applicable to the first four customized service types will now be discussed. In some embodiments, a Key Performance Indicator (KPI) guarantee for a VN can be provided. This allows for specifying a service guarantee with a QoE/KPI score which maps to some number of QoE/KPI parameters such as jitter, throughput, latency, etc. Such guarantees can be stated in relation to a threshold percentage (X %). For instance, a guarantee that the service provided will meet the criteria such as: X % users in outage/satisfaction, X % area for a given QoE/outage statistics, X % blocking, X % dropping, and/or outage statistics for a specific geographical area, user category etc.

Embodiments relating to End-to-End QoE are discussed above. It is noted that in other embodiments End-to-End per-connection QoE can be provided. Further in some embodiments the controller 210, 310 discussed in FIGS. 2 and 3 can include a traffic engineering (TE) function, which in some embodiments can be a SONAC-TE. Further closed-loop QoE management as discussed above can be dynamic. Further, in some embodiments, dynamic closed-loop per-user QoE control can be provided. Further some embodiments can provide dynamic and closed-loop KPI control. For example, network wide KPIs can be monitored and feedback provided to a controller, for example, a SONAC controller, for adjustment. In some embodiments, penalties can be specified to address variability.

Embodiments of the present invention related to CSM and QoE management comprise establishment of a Service oriented VN with QoE/KPI guarantees.

Figure 9:
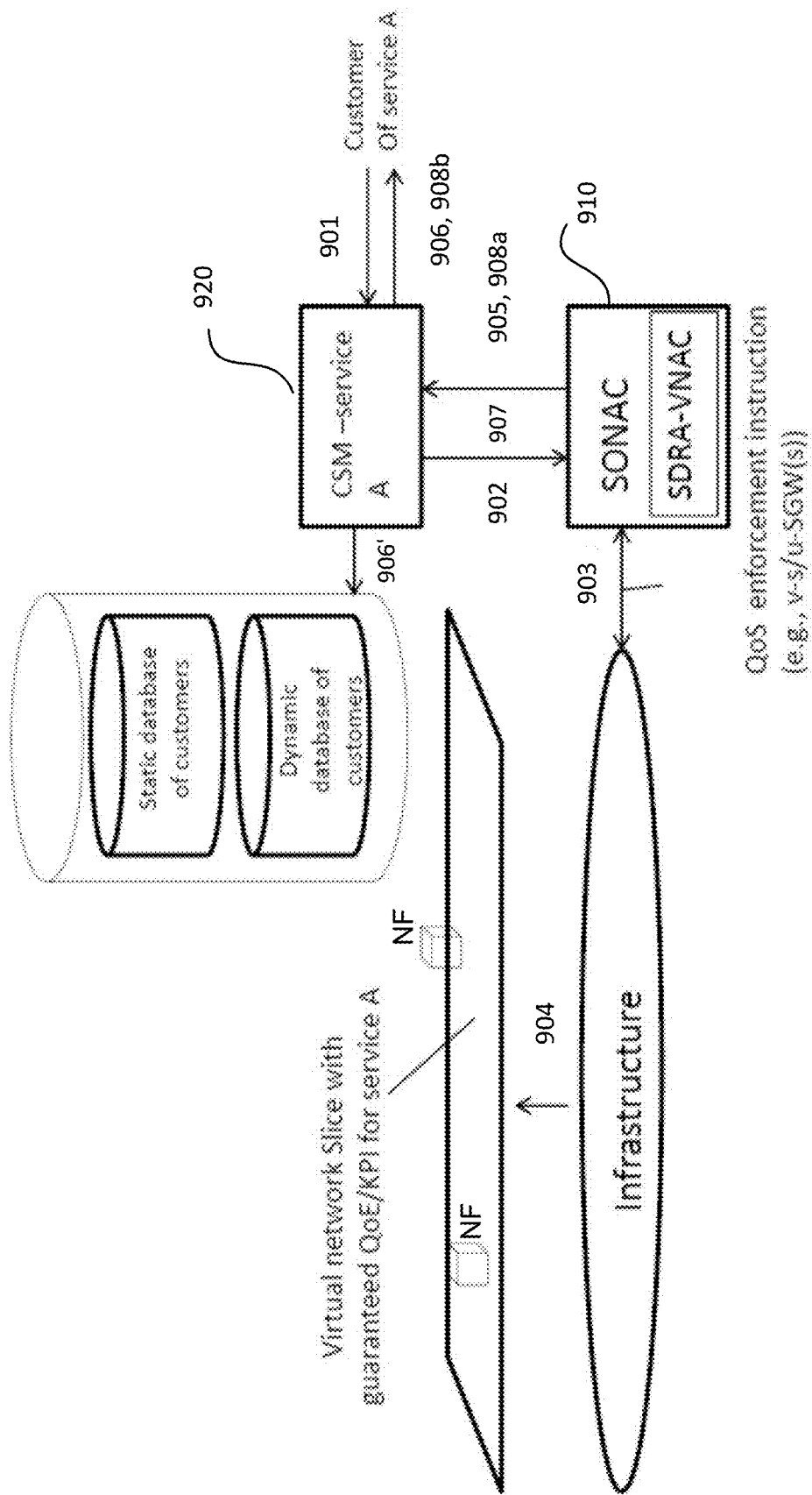
FIG. 9 illustrates a process for Service oriented VN establishment in accordance with embodiments of the present invention.

FIG. 9 illustrates a process for Service oriented VN establishment procedure in accordance with embodiments of the present invention.

In request operation 901, a customer interacts with a G-CSM 920, for example via a defined API, to negotiate access to a service A. The information provided in the request operation 901 allows the G-CSM 920 to develop a series of parameters for a VN establishment and charging rules. In an aspect, the request operation 901 may comprise a customer submitting a single request for a service to the G-CSM 920. In an aspect, the request operation may comprise a plurality of operations comprising a service negotiation between the customer and the G-CSM 920 to identify the requested service, service level, and charging for that service. The G-CSM 920 may refer to the static database, the dynamic database, and/or a combination of the static and dynamic databases to obtain customer information and preferences relevant to the service negotiation.

In setup operation 902, the G-CSM 920 interfaces with the illustrated SDN controller 910 for virtual network setup, which in this example is illustrated as a SONAC controller. It is noted that other types of controllers, or in some embodiments a MANO function such as an orchestrator, may be used. This process may be handled during VN admission control and it may involve SDRA-VNAC. The SDRA-VNAC may embed instances of control entities during the admission. The VN setup instructions allow the controller 910 to map the requirements from the G-CSM 920 to the available Infrastructure resources. This forms the foundation of the virtual nodes and virtual links that allow for the creation of the service-specific VN. If SDRA-VNAC cannot admit the customer to the service, it will try to acquire more resources, reduce the existing VN's requirements (if the requirements are dynamic), or negotiate with the customer for lower requirements for the service A. In some embodiments a SLA is established and policies are included in the databases and the SONAC components.

In assignment operation 903, data forwarding and access resource assignment information are used to instantiate the virtual network nodes/virtual functions using the network infrastructure.

In slice instantiation operation 904, a service-specific VN is established using the virtual nodes, functions and links defined by the earlier operations to provide the service A. QoS/QoE enforcement is carried out at the slice level by the involved virtual nodes. For example, enforcement may include rate assurances and/or rate caps. In some embodiments, either (or both) of traffic monitoring and data analytics can be provided by the infrastructure elements in the VN sliced or by elements outside the slice.

In VN reporting operation 905, the controller 910 informs G-CSM 910 of the VN establishment.

In customer reporting operation 906, the G-CSM 920 informs the customer of the VN establishment. In optional update operation 906' the G-CSM 920 may update the dynamic customer database to log the customer, the instantiation of the VN, and relevant service parameters negotiated with the customer for that service. As such, QoE, QoS, policies, and charging rules may be negotiated, defined, and allocated on a per-service basis. In some aspects, the static database may include customer preferences. In these aspects during the service negotiation with the customer the G-CSM 920 may refer to the static database for default preferences by customer, device, and/or service. In some aspects, the customer may override the default preference for that service during the service negotiation.

In configuration operation 907, G-CSM 920 configures CMS-charging element(s) and QoS delivery monitoring element in selected network nodes for that service. In some embodiments, CMS-charging elements and QoS delivery monitoring elements and/or charging elements may be co-located with the v-s/u-SGWs. Various data may also be logged, such as delay data, cloud resources usage data, bandwidth usage data, and the like. Further, pre-defined parameters for triggering update and service VNs may be provided and/or used. It should be noted that these operations can be repeated, and the parameters updated as necessary, when the G-CSM 920 is informed of a necessary service level change by the customer.

In usage report operation 908a, and charging operation 908b customer charging may be performed. This may be final or regular charging. Information monitored at the VN, or at the controller 910 is sent by the controller 910 to the G-CSM 920 in operation 908a. In operation 908b, a logged performance profile and optionally a promised performance metric according to the agreed policy for the charging period are compared and a Bill/credit is issued for payment-per-service. This may include, for instance, comparing logged QoS parameters with promised QoS parameters and issuing a bill, credit, or the like in accordance with billing arrangements, whether they are based on transactional billing, billing for a general level of service, billing for availability of a service or other such arrangements. In some embodiments, the collected logged QoS and promised QoS for all services within a charging period are compared and a bill, credit, or the like is issued.

Embodiments of the present invention related to CSM and QoE management comprising closed loop QoE/QoS management will now be discussed.

In various embodiments, closed-loop management provides a mechanism by which feedback from a customer, in relation to a service, is taken into account when the network adjusts QoE/QoS parameters for that service. Customers may determine whether they are satisfied with a service and feed information back to the network in the form of a QoE report. This feedback may be automated for example, by monitoring and feedback applications. In various embodiments, the feedback may provide for a substantially timely adjustment in QoE/QoS, for example, while the service is being provided rather than after the fact. In some embodiments this allows for dynamic control and dynamic change of customer requirements.

Figure 10:
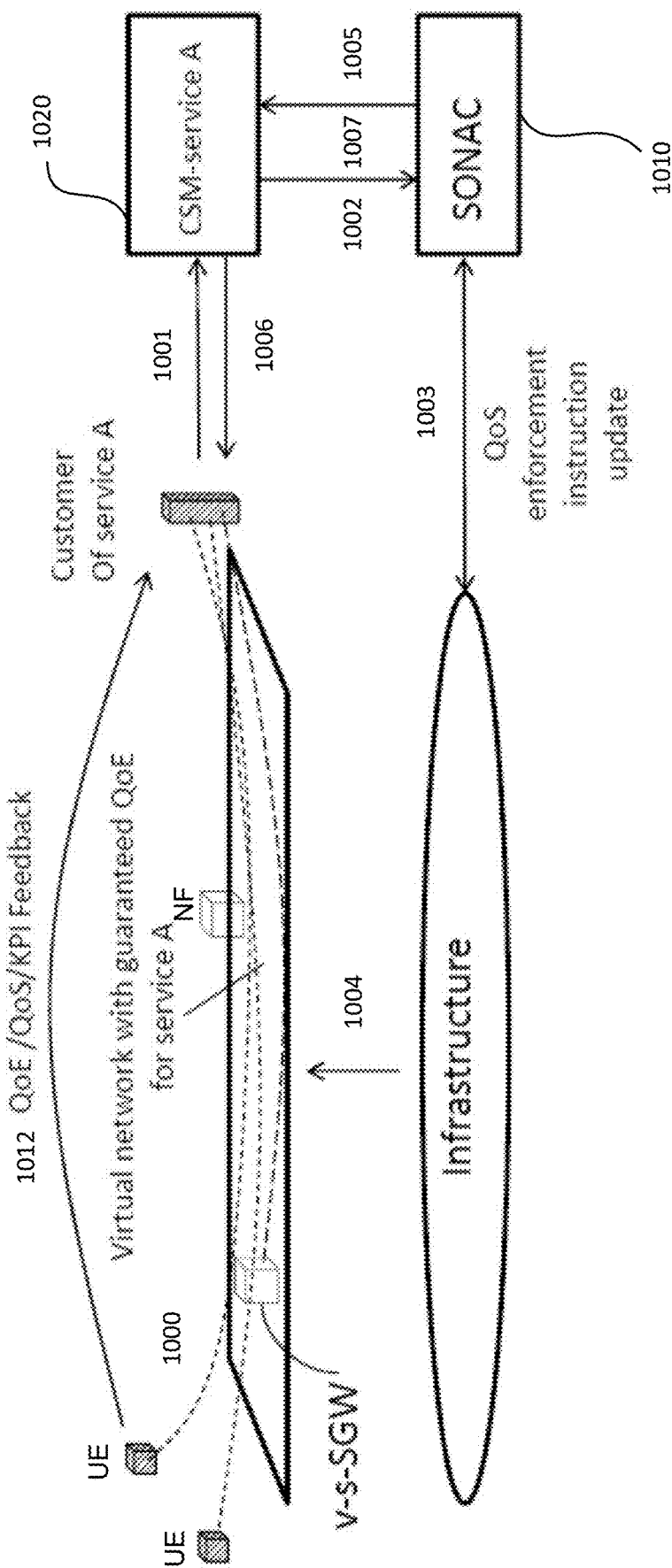
FIG. 10 illustrates a process for dynamic QoE/QoS management in accordance with embodiments of the present invention.

FIG. 10 illustrates an embodiment of a process for dynamic QoE/QoS management. This process can be used for Delivery of QoE based KPI Guarantees, QoE delivery to a specific service and/or user, and/or Dynamic change of customer requirements In QoE logging operation 1000, a service participant, such as a UE, v-s/u-SGW, or server can log QoE/QoS/KPI for a service. In feedback operation 1012, the participants can report these logged finding as aggregated feedback to the customer of service A.

In QoE reporting operation 1001, the customer reports the QoE to the CSM 1020. The QoE reporting operation 1001 may be periodic, at service termination, or may be triggered by a fall in QoE, such that the quality experienced was below a promised quality. In some aspects, the QoE reporting 1001 may report that the QoE is acceptable, or better than promised quality.

For example, for delivery of QoE based KPI Guarantees, the customer provides feedback to the slice-specific CSM 1020 (QoE stats or KPI based on QoE). Responsive to the QoE reporting operation 1001, the CDM 1020 may evaluate the reported QoE againsed a promised quality metric and, if necessary, in network update operation 1002, the CSM 1020 may send network update instructions to the controller 1010 to adjust the allocated network resources to meet the promised quality. In operation 1003, the controller 1010 may engage in QoS enforcement be sending updated instructions to the infrastructure. The updated instructions may be implemented at update step 1004 on the virtual nodes comprising the VN for service A.

As another example, for dynamically changing customer requirements, in feedback operation 1012, the service participants may report the QoE parameters to be adjusted to the customer. Then, in QoE reporting operation 1001 the customer requests changing QoS (or another parameter) to the network's G-CSM 1020 for a specific device or group of devices accessing service A. The G-CSM 1020 may then execute a network update operation 1002 responsive to the dynamically changing customer requirements.

VN reporting operation 1005 corresponds to the VN reporting operation 905 described above, with the addition that the VN reporting operation 1005 may further relate to the controller 1010 informing the G-CSM 1010 of completion of VN updates. Customer reporting operation 1006 likewise relates to customer reporting operation 906 described above, and may further relate to informing the customer of completion of VN updates. Configuration operation 1007, relates to configuration operation 1007 above.

Embodiments of the present invention, as related to charging for a Customized Connectivity Slice (VN) will now be discussed. The network functions, their interactions, and traffic control may be different for different methods. Accordingly, four example options for charging for a connectivity service will be discussed. These four options include:

Fixed/Specified demand—fixed charging rate per time slot and region;

Variable demand—fixed charging rate per time slot and region;

Resource reservation/hard slice—Fixed charge;

Network load/state based dynamic charging—Charging rate changes;

One embodiment for charging for a customized connectivity slice is based on fixed (i.e., specified) demand. This can include fixed charging on such basis as fixed charging per time slot and region. For example, a customer specifies demand statistics for different time periods over different geographical regions for its slice. An example is shown in the table in FIG. 11.

Figure 12:
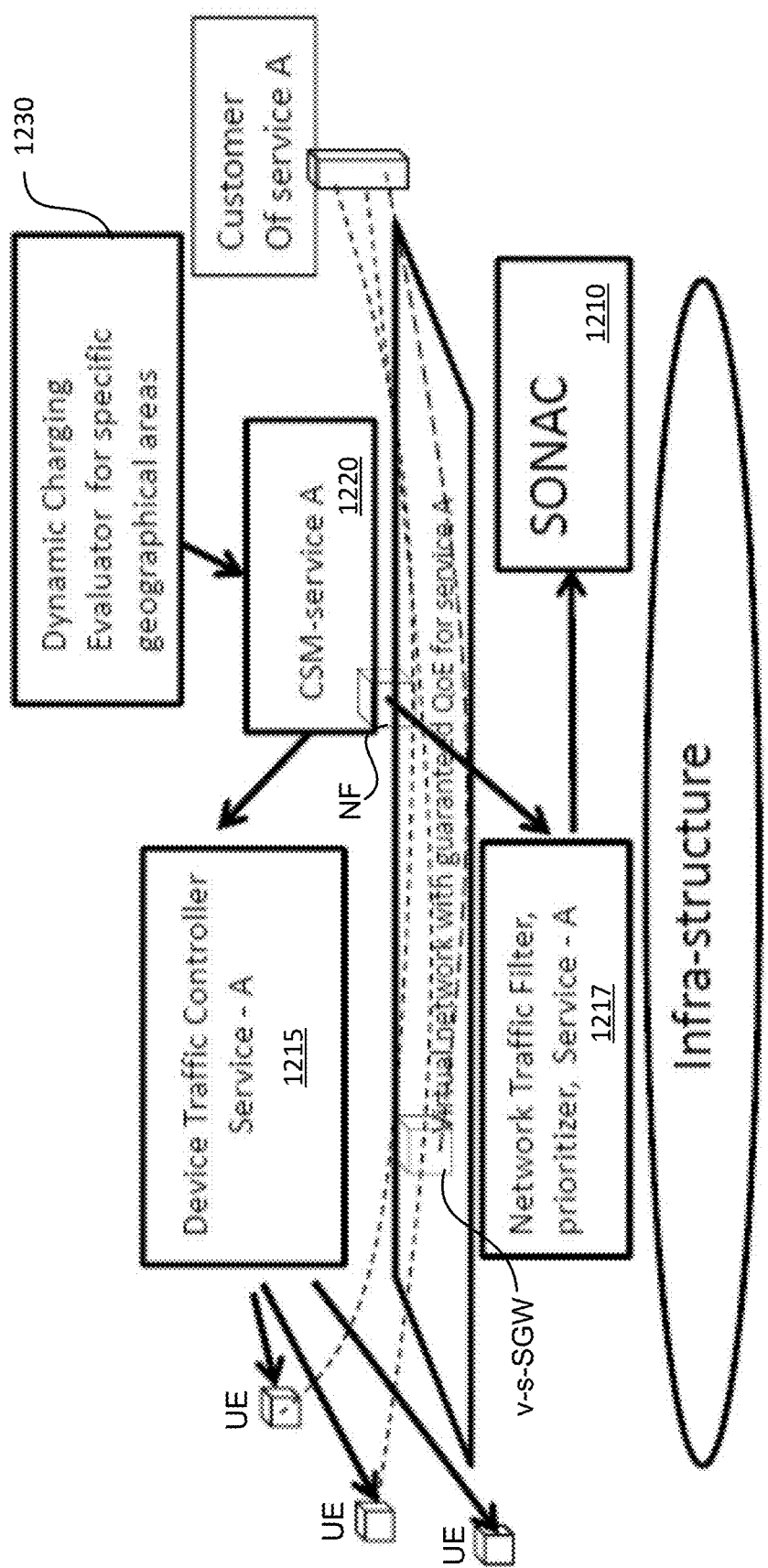
FIG. 12 illustrates control of traffic generation in accordance with an embodiment of the present invention.

FIG. 12 illustrates a dynamic charging scenario in which a customer can reduce its costs by limiting the data traffic when the charging rate is high by adjusting the traffic policy applied to its service(s). By way of example, in an automation context UEs in the form of sensors may be operative to continuously transmit information updates. A customer, however, may decide that it doesn't need the continuous updates from all of the sensors during a high charging rate period. Accordingly, the customer may change its traffic policy to limit service access to a selected few sensors during the high charging rate period, and revert to full service access during a low charging rate period. The customer can make the adjustment by a) directly informing the UEs to control the data traffic they generate; and/or, b) change the traffic policy with the G-CSM to selectively limit service access to a selection of the UEs. In the latter case, the dynamic trigger for changing the traffic policy is the current charging condition on the network.

CSM-service-A can inform the device traffic controller or network traffic filters to instruct them to filter traffic, prioritize, block, on a device-type or traffic-type basis.

In an aspect, traffic in a particular slice may be controlled when charging is dynamic based upon a current charging state of the slice.

In such a scenario, the Service provider (TCSP) admits the request only if it can provide the demand guarantees. The TCSP may share resources among multiple slices, but still provide statistical guarantees. Admission control is relatively straight forward as the TCSP has to cater for a fixed demand in a given time and space. Penalties will be specified for violating these guarantees, which allows network operator to decide how much room is available to obtain a multiplexing gain.

In some embodiments charging can consider a variety of factors. One such factor considers geographical flat charging vs region based charging. Instead of separate charges for different geographical zones, total traffic over the whole area can be considered, or charging can be based on a peak traffic demand specification. In some casesc the TCSP may prefer not to distinguish different geographical areas for economic reasons (for example, if an area has insufficient traffic, the TCSP may waste resources, the cost of which cannot be recovered). To avoid this, the customer can introduce manage data traffic generation at the UE-level to buffer data at the UE to spread data transmission over time and/or space for which traffic monitoring, controlling, policing, controlling generation might be needed.

Another factor considers flat charging over time vs different charging for different time zones. Instead of different time zones, total traffic over the period or peak traffic based demand specification can be used. A TCSP may benefit from providing demand as a total over the period as it might need compensation for wastage of resources under low traffic loads. Once again, to avoid this, the customer can introduce some traffic spreading over time and space for which traffic monitoring, controlling, policing, controlling generation might be needed.

Instead of specific traffic-type demands, in some embodiments the customer can request an aggregated equivalent traffic demand. The customer may get the partial benefit of multiplexing and still allow higher traffic for urgent or important applications. However, if penalties cannot be implemented based on individual traffic types, it is upto the customer to take specific measures to determine and prioritize the importance for certain traffic types. Accordingly, the customer should include some mechanism to control the individual traffic types. For example, to support such a prioritization, the customer can request network filtering, smoothing, marking, and prioritization from the network.

In some embodiments, the customer may be another service provider after obtaining a bulk service demand slice, i.e. a VN providing service to a different individual customer population. One option to specify such a fixed demand in the SLA is based on an individual service type based demand specification. For example, the customer only admits users or controls user traffic such that the traffic demands for specific traffic types in each region is not exceeded. Another option to specify such a fixed demand is based on the aggregated equivalent demand for all the service types is specified. For example, the customer admits users or controls user traffic such that the aggregated traffic demand is not exceeded and services can be prioritized to maximize overall service satisfaction according to customer wishes.

As should be appreciated, suitable functions can be included in the network to implement such schemes and the type of control the customer may need.

It should be appreciated that other options can be used apart from charging based on a fixed/specified demand. Other options include:

variable demand charging—including charging variable rates per time slot and region;

resource reservation/hard slice—fixed charging; and, network load/state based dynamic charging—in which the charging rate changes based on the state of the network.

In some embodiments, a network can implement demand based charging, also referred to as dynamic charging, in which case usage charges may be increased in specific areas based on current demands for network capacity. Some embodiments allow customers, or possibly a subset of customers who have subscribed to a dynamic charging service, to be able to shift network traffic usage away from peak times/areas if possible (Device traffic control, prioritization etc.). In some embodiments traffic prioritization, smoothing, rejection, filtering could be done by the network as per CSM instructions to address this situation.

FIG. 12 illustrates control of traffic generation in accordance with an embodiment of the present invention. FIG. 13 illustrates controlling traffic generation for a particular service, labelled as service A. A dynamic charging evaluator (DCE) function 1230 operates for specific geographical areas. The DCE 1230 communicates with the CSM 1220 for service A but it should be appreciated that the DCE 1230 can communicate with the CSM for other services which are not shown. The DCE 1230, in conjunction with the CSM 1220 for service A and device traffic controller 1215 for service A co-operate to allow end-devices or associated users to adjust traffic-generating behaviours and/or to temporarily stop data transmissions from certain identified devices or types of devices, based on dynamic charging conditions. This instruction may be provided from the DCE 1230 to the CSM 1220 and then to the device traffic controller 1215, which in turn informs the appropriate devices of the instructions.

In some aspects, a network traffic filter, prioritizer (NTF) 1217 may be in communication with the CSM 1220 to effect traffic management. For instance, as described above a customer may choose to filter some or all of its traffic during high charging periods. In such as case, the updated charging policy may be implemented by the CSM 1220 to instruct the NTF 1217 to filter specified UEs accessing service A, to prioritize specific traffic above or below other traffic, and/or to effect other network filtering operations necessary to effect traffic management on the VN. As necessary, the NTF 1217 may engage the SONAC 1210 to effect its management tasks.

Dynamic Slice Capability Change Due to Dynamic Charging by the Network

In some embodiments a network may apply a dynamic charging policy based on network load and/or resource availability. In order to control the cost, the customer may want to reduce/increase the slice capability (size of the slice). Some embodiments provide a customer with an interface to network charging information (may be based on the geographical area) and a customer function may be operative to request to reduce/increase the slice capabilities and to dynamically negotiate with the G-CSM (SN) 1220 to implement such a change. In some embodiments a customer can utilize a device traffic controller 1215 in the network to instruct the specific devices to control their traffic to meet the traffic capability of the slice considering customer's service priorities. For example, a customer function may have pre-classified its users (e.g. group A, B, C, D) and will only allow (e.g., admit) one category of users to send traffic at a given time when congestion happens. Further, a customer may send traffic controlling commands to individual users/devices.

CSM Context: Dynamic Control of Traffic by Customer for Resource Reserved Slice or Hard Slices In some embodiments dynamic control of traffic can be made for a resource reserved slice or hard slices. In some embodiments a customer device can request a certain amount of resources for its end devices/users. A customer can obtain current traffic distribution and the traffic generating device statistics from the CSM 1220. In some embodiments a customer has a device traffic controller 1215 in the network operative to instruct the specific devices to control their traffic to meet the traffic capability of the slice considering customer's service priorities. In such an example the current traffic distribution and traffic generating device statistics may be used by the customer to control traffic generation. In an aspect, a customer function may include polling to monitor traffic for each device accessing the service A. Customer functions may have pre-classified its users (e.g. group A, B, C, D), and will allow only one category of users to send traffic at a given time when congestion happens. The customer function may change priority scheme to allow high priority users to user the network when congested.

CSM—Context-Dynamic Customer Traffic Control

In some embodiments a customer can request a slice capable of limited network traffic capability to reduce costs. Accordingly, the customer obtains current traffic distribution and the traffic generating device statistics from the CSM 1220. As per the above example, the customer may direct the device traffic controller 1215 to instruct the specific devices to control their traffic to meet the traffic capability of the slice considering the customer's service priorities Dynamic Customer Caching and Pre-Fetching Control In some embodiments a customer network function may be operative to determine the amount/percentage/policy for caching its data by the network nodes in the slice. The customer device may obtain from the network function current traffic distribution, the traffic generating device statistics, and cache and pre-fetched data usage statistics, from the CSM 1220, or from a dedicated data analytics management system. The customer may obtain the charging costs for in-network caching and cost differential (potential savings) from the cost of transportation to cached points vs. transmitting traffic during the current charging period. Depending on the transport costs and storage costs and the other benefits of specific caching, the customer function may apply a cost evaluation function to evaluate whether to dynamically change the established caching rules to reduce cost. In some embodiments, the customer may also be aware of certain content types that may be requested from multiple devices of its slice (in some cases the data types may not necessarily be needed in the same time) and give instructions to the network to cache those types of content over a longer period of time. For instance, a news service may maintain current content cached at the network level, rather than transmitting it for every request. Older material may be deleted from the network cache, and served by the customer as required.

It will be readily understood that, throughout the preceding discussion, the above-described network functionalities and operations may correspond to a method for use in supporting operation a communication network, such as a 5G wireless communication network. The method may involve computer-implemented functions, namely functions which are implemented by one or more computing, communication and/or memory components of the network infrastructure. These components may take various forms, such as specific servers or general-purpose computing, communication and/or memory devices which are configured to provide the required functionality through virtualization technologies. The method may involve the operation of one or more network components in order to improve the operation of the network. As such, with the communication network viewed as an apparatus, embodiments of the present invention may be directed to improving internal operations of the communication network.

Further, it will be readily understood that embodiments of the present invention relate to a communication network system or associated apparatus thereof, which is configured to perform the above-described network functionalities and operations. Again, the system or apparatus may comprise one or more computing, communication and/or memory components of the network infrastructure, which may take various forms, such as specific servers or general-purpose computing, communication and/or memory devices which are configured to provide the required functionality through virtualization technologies. Various methods as disclosed herein may be implemented on one or more real or virtual computing devices, such as devices within a communication network control plane, devices operating in the data plane, or a combination thereof. Computing devices used to implement method operations may include a processor operatively coupled to memory, the memory providing instructions for execution by the processor to perform the method as described herein.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocatable for providing various computing resources which in turn are used to realize various computing components of a system, may be regarded as providing a distributed computing system, the internal architecture of which may be configured in various ways.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for providing Customer Service Management (CSM) in a communication network, the communication network providing a service involving one or more terminals serviced by the communication network, the method comprising:
   receiving from a customer device, by a customer service management (CSM) function element defined based upon said service and customized to said service, an indication that a service level performance, at which the service is to be provided by a virtual network of a communication network, is not currently being met by the virtual network;
   in response to the indication, transmitting a message to a virtual network setup controller, the message prompting the virtual network setup controller to reconfigure the virtual network, network infrastructure underlying the virtual network, or both, to meet the service level performance; and
   in response to the message, transmitting a response message, by the virtual network setup controller to the CSM function element, that the network infrastructure has been reconfigured; and
   in response to the response message, transmitting a further message by the CSM function element to the customer device, indicative that the network infrastructure has been reconfigured.

2. The method of claim 1, wherein the service involves plural terminals, at least one of the plural terminals supports plural services, or a combination thereof.

3. The method of claim 1, wherein the CSM function element provides charging data for said service.

4. The method of claim 3, wherein rules for providing said charging data are customized to said service.

5. The method of claim 3, further comprising transmitting another further message to the virtual network setup controller to configure one or more charging elements, one or more Quality of Service (QoS) delivery monitoring elements, or both, within the virtual network based on network-topological aspects of the service, the one or more charging elements configured to generate charging information based on usage of the virtual network, the QoS delivery monitoring elements configured to monitor QoS delivery for charging adjustment, network performance adjustment, or both.

6. The method of claim 1, wherein the CSM function element provides context management customized to said service.

7. The method of claim 1, wherein the CSM function element provides Quality of Service management, Quality of Experience management, or a combination thereof, customized to said service, wherein providing the Quality of Service management and Quality of Experience management comprises causing the virtual network setup controller to adjust the virtual network in response to feedback from the customer device.

8. The method of claim 7, wherein the Quality of Experience management comprises receiving feedback from a customer receiving the service, the feedback indicative of a deficiency in the service level performance, and adjusting one or both of: network resource allocations determinative of Quality of Experience of the service; and pricing of the service, during providing of the service.

9. The method of claim 8, wherein a topology of the communication network is adjustable through virtualization, the method further comprising, based on the feedback, customizing the topology of the communication network to the service.

10. A Customer Service Management (CSM) function element in a communication network, the communication network providing a service involving one or more terminals serviced by the communication network, the CSM function element based upon said service and customized to said at least one service, the CSM function element configured to:
receive, from a customer device, an indication that a service level performance, at which the service is to be provided by a virtual network of the communication network, is not currently being met by the virtual network;
in response to the indication, transmit a message to a virtual network setup controller, the message prompting the virtual network setup controller to reconfigure the virtual network, network infrastructure underlying the virtual network, or both, to meet the service level performance; and
in response to a response message, from the virtual network setup controller, that the network infrastructure has been reconfigured, transmit a further message, to the customer device, indicative that the network infrastructure has been reconfigured.

11. The CSM function element of claim 10, wherein the service involves plural terminals, at least one of the plural terminals supports plural services, or a combination thereof.

12. The CSM function element of claim 10, further configured to provide charging data for said service.

13. The CSM function element of claim 10, further configured to provide context management customized to said service.

14. The CSM function element of claim 10, further configured to provide Quality of Service management, Quality of Experience management, or a combination thereof, customized to said service, wherein providing the Quality of Service management and Quality of Experience management comprises instructing the virtual network setup controller to adjust the virtual network in response to feedback from the customer device.

15. The CSM function element of claim 10, wherein a topology of the communication network is adjustable through virtualization, the CSM function element further configured to customize, based on feedback from the customer device, the topology of the communication network to the service.

16. The method of claim 1, wherein configuring the network infrastructure comprises providing virtual network nodes, virtual functions, or both, with data forwarding and access resource assignment information for use in providing the virtual network.

17. The method of claim 1, wherein the virtual network is specific and dedicated to providing the service.

18. The method of claim 8, wherein the feedback is based on performance monitoring performed by the customer during providing of the service.

19. The method of claim 8, wherein adjusting said network resource allocations comprises transmitting a reconfiguration message to the virtual network setup controller, the reconfiguration message prompting the virtual network setup controller to reconfigure the network infrastructure to provide the virtual network meeting the service level performance.

20. The method of claim 1, further comprising receiving, from the customer device, a request to establish the virtual network and implement a charging rule defined at least in part by the customer device.

21. The method of claim 5, wherein the charging elements, the QoS delivery monitoring elements, or both, are configured and located within nodes of the virtual network based on the other further message.

22. The CSM function element of claim 12, further configured to transmit another further message to the virtual network setup controller to configure one or more charging elements, one or more Quality of Service (QoS) delivery monitoring elements, or both, within the virtual network based on network-topological aspects of the service, the one or more charging elements configured to generate charging information based on usage of the virtual network, the QoS delivery monitoring elements configured to monitor QoS delivery for charging adjustment, network performance adjustment, or both.

23. The CSM function element of claim 14, wherein the Quality of Experience management comprises receiving feedback from a customer receiving the service, the feedback indicative of a deficiency in the service level performance, and adjusting one or both of: network resource allocations determinative of Quality of Experience of the service; and pricing of the service, during providing of the service.

24. The CSM function element of claim 23, wherein the feedback is based on performance monitoring performed by the customer during providing of the service.

25. The CSM function element of claim 23, wherein adjusting said network resource allocations comprises transmitting a reconfiguration message to the virtual network setup controller, the reconfiguration message prompting the virtual network setup controller to reconfigure the network infrastructure to provide the virtual network meeting the service level performance.

26. The method of claim 1, wherein the service level performance is indicative of a percentage of users which are satisfied with provision of the service.

27. The CSM function element of claim 10, further comprising the customer device, configured to generate and transmit the indication that the service level performance, at which the service is to be provided by the virtual network, is not currently being met by the virtual network.

* * * * *